United States Patent
Chen et al.

(10) Patent No.: US 12,517,315 B2
(45) Date of Patent: Jan. 6, 2026

(54) FIBER OPTIC SYSTEM WITH MULTIMODE OPTICAL FIBER CABLES AND FIBER CONNECTIONS WITH MODE-MATCHING SINGLE-MODE FIBER DEVICES

(71) Applicant: CORNING RESEARCH & DEVELOPMENT CORPORATION, Corning, NY (US)

(72) Inventors: Hao Chen, Pudong (CN); Xin Chen, Painted Post, NY (US); Kangmei Li, San Jose, CA (US); Ming-Jun Li, Horseheads, NY (US); David Wayne Meek, Keller, TX (US); Qi Wu, Painted Post, NY (US); Chen Xia, San Jose, CA (US); Andy Fenglei Zhou, Fremont, CA (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 267 days.

(21) Appl. No.: 18/483,585

(22) Filed: Oct. 10, 2023

(65) Prior Publication Data

US 2024/0036279 A1    Feb. 1, 2024

Related U.S. Application Data

(63) Continuation of application No. PCT/US2022/025448, filed on Apr. 20, 2022.
(Continued)

(51) Int. Cl.
*G02B 6/42* (2006.01)
*G02B 6/38* (2006.01)

(52) U.S. Cl.
CPC ......... *G02B 6/4292* (2013.01); *G02B 6/3825* (2013.01); *G02B 6/3846* (2013.01)

(58) Field of Classification Search
CPC .................................................. G02B 6/4292
(Continued)

(56) References Cited

U.S. PATENT DOCUMENTS

| 4,641,914 A | 2/1987 | Sheem |
| 4,723,828 A | 2/1988 | Garel-Jones et al. |

(Continued)

FOREIGN PATENT DOCUMENTS

| AU | 2014200116 A1 | * | 1/2014 | |
| CN | 105759371 A | * | 7/2016 | ............... G02B 6/32 |

(Continued)

OTHER PUBLICATIONS

Bayvel et al., "2.5Gbit/s transmission over 4.5km of 62.5um multimode fibre using centre launch Technique", Electronics Letters, Jan. 6, 2000, vol. 36 No. 1, 3 pages.
(Continued)

*Primary Examiner* — Kaveh C Kianni
(74) *Attorney, Agent, or Firm* — Adam R. Weeks

(57) ABSTRACT

Disclosed herein is a fiber optic system including at least one fiber optic cable assembly having a multimode optical fiber for communication of an optical data signal at an operating wavelength and a devices having a single-mode fiber stub with a mode field diameter within 20% of the mode field diameter of the fundamental mode of the multimode optical fiber at the operating wavelength. The single-mode fiber stub is secured to a ferrule, and a center of a core of the single-mode fiber stub is within 0.5 μm of a center of the ferrule. An end of the single-mode fiber stub that extends to or beyond the back end of the ferrule and forms an optical connection with the multimode optical fiber where the center of the single-mode fiber stub is within 2 μm of a center of the multimode optical fiber.

20 Claims, 14 Drawing Sheets

Related U.S. Application Data

(60) Provisional application No. 63/181,998, filed on Apr. 30, 2021, provisional application No. 63/216,624, filed on Jun. 30, 2021, provisional application No. 63/305,860, filed on Feb. 2, 2022.

(58) Field of Classification Search
USPC .......................................................... 385/72
See application file for complete search history.

(56) References Cited

U.S. PATENT DOCUMENTS

| | | | |
|---|---|---|---|
| 4,923,274 A | | 5/1990 | Dean |
| 5,712,937 A | * | 1/1998 | Asawa ............... G02B 6/12007 385/12 |
| 5,748,819 A | | 5/1998 | Szentesi et al. |
| 6,185,346 B1 | * | 2/2001 | Asawa ................. G02B 6/262 385/28 |
| 6,363,195 B1 | | 3/2002 | Abbott et al. |
| 6,487,338 B2 | | 11/2002 | Aswawa et al. |
| 6,758,600 B2 | | 7/2004 | Del et al. |
| 6,798,962 B2 | | 9/2004 | Berkey et al. |
| 6,869,227 B2 | | 3/2005 | Del et al. |
| 7,104,702 B2 | | 9/2006 | Barnes et al. |
| 7,147,383 B2 | | 12/2006 | Sullivan |
| 7,184,623 B2 | | 2/2007 | Cai et al. |
| 7,237,966 B2 | | 7/2007 | Quinby et al. |
| 7,283,701 B2 | * | 10/2007 | Hallemeier ............... G02B 6/14 385/27 |
| 7,572,064 B2 | | 8/2009 | deJong |
| 7,724,995 B2 | | 5/2010 | De et al. |
| 8,251,591 B2 | | 8/2012 | Barnes et al. |
| 8,873,967 B2 | | 10/2014 | Barnes et al. |
| 9,678,269 B2 | | 6/2017 | Chen et al. |
| 10,451,803 B2 | * | 10/2019 | Chen ..................... G02B 6/268 |
| 10,816,734 B2 | | 10/2020 | Chen et al. |
| 2002/0126954 A1 | | 9/2002 | Aswawa et al. |
| 2003/0031408 A1 | | 2/2003 | Ota |
| 2005/0025417 A1 | * | 2/2005 | Hallemeier ........ H04B 10/2581 385/28 |
| 2005/0207709 A1 | | 9/2005 | Del et al. |
| 2005/0265653 A1 | | 12/2005 | Cai et al. |
| 2006/0024001 A1 | * | 2/2006 | Kobayashi ............. G02B 6/381 385/88 |
| 2006/0034573 A1 | | 2/2006 | Guan et al. |
| 2010/0098428 A1 | | 4/2010 | Barnes et al. |
| 2013/0039626 A1 | | 2/2013 | Bickham et al. |
| 2013/0266033 A1 | | 10/2013 | Tan et al. |
| 2013/0322825 A1 | | 12/2013 | Cooke et al. |
| 2014/0086577 A1 | | 3/2014 | Chen et al. |
| 2014/0086578 A1 | | 3/2014 | Bickham et al. |
| 2015/0331181 A1 | * | 11/2015 | Chen .................. G02B 6/02004 385/124 |
| 2015/0333829 A1 | * | 11/2015 | Chen ..................... G02B 6/268 398/143 |
| 2016/0142142 A1 | | 5/2016 | Ryf et al. |
| 2016/0164612 A1 | * | 6/2016 | Wilks ................. H04B 10/2581 398/79 |
| 2017/0123162 A1 | | 5/2017 | Matsuda et al. |
| 2020/0036444 A1 | * | 1/2020 | Chen ..................... G02B 6/3825 |

FOREIGN PATENT DOCUMENTS

| | | | |
|---|---|---|---|
| CN | 217443582 U | * | 9/2022 |
| DE | 102012020589 A1 | | 4/2014 |
| DE | 102012020590 A1 | | 4/2014 |
| JP | 4586546 B2 | * | 11/2010 ........... G02B 6/1228 |
| WO | 2014/011525 A2 | | 1/2014 |
| WO | 2014/063901 A1 | | 5/2014 |

OTHER PUBLICATIONS

International Search Report and Written Opinion of the International Searching Authority; PCT/US2022/025448; dated Jul. 13, 2022; 12 pages; European Patent Office.

Saravanos et al., "Optical fiber design for field mountable connectors," in Journal of Lightwave Technology, vol. 18, No. 3, pp. 314-319, Mar. 2000.

Xin et al: "A fiber modal adapter for upgrading 850 nm multimode fiber links to 1310 nm single-mode transmission", Optical Fiber Technology, Elsevier, Amsterdam, NL, vol. 56, Mar. 18, 2020.

* cited by examiner

FIBER OPTIC SYSTEM WITH MULTIMODE OPTICAL FIBER CABLES AND FIBER CONNECTIONS WITH MODE-MATCHING SINGLE-MODE FIBER DEVICES

PRIORITY APPLICATIONS

This application is a continuation of International Application No. PCT/US22/25448, filed on Apr. 20, 2022, which claims the benefit of priority to U.S. Provisional Application No. 63/181,998, filed on Apr. 30, 2021, U.S. Provisional Application No. 63/216,624, filed on Jun. 30, 2021, and U.S. Provisional Application No. 63/305,860, filed on Feb. 2, 2022, the content of these applications being relied upon and incorporated herein by reference in their entirety.

BACKGROUND

The disclosure relates to fiber optic systems, and more particularly, to fiber optic systems with multimode optical fiber cables and fiber optic connections with mode-matching single-mode fiber devices.

Multimode optical fibers have been used widely in short distance communications such as in data centers and in campus networks etc. Such fibers are used because the light sources in the transceivers in the optical devices are multi-mode light sources. Also, historically it has been easier to work with multimode fiber than single-mode fiber. Unfortunately, multimode fiber has a lower bandwidth-distance product due to modal dispersion, which makes it difficult and expensive to extend the reach or to increase the data rate of the optical fiber transmission system. Replacing the deployed multimode fiber cable is also difficult and expensive in some cases as the cables are buried deep into building infrastructure.

In addition, the existing multimode fibers are optimized for operation at a nominal wavelength of 850 nm, at which multimode fibers have high chromatic dispersion. For longer reach or higher data rate transmission, the transmission is often done around 1310 nm or around 1550 nm through single-mode fibers using single-mode transceivers. It is desired in some cases to have an operating wavelength of nominally around 1300 nm where the chromatic dispersion is the lowest.

There has been increasing interest in using single-mode transceivers with multimode fiber in data centers for improved interoperability, providing a smooth upgrade path and easier logistical management, all of which provide economic and financial benefits. Consequently, it is advantageous to have ways of improving the performance of a multimode optical fiber transmission system without incurring the time, labor, and expense of having to replace the multimode fibers.

SUMMARY

Various devices are disclosed for a fiber optic system that includes at least one fiber optic cable assembly having a multimode optical fiber, wherein the system is configured for transmission of an optical data signal at an operating wavelength that is in a range from 1260-1360 nm or in a range from 1530-1565 nm. The devices allow single-mode transmission over the existing multimode optical fiber. The devices may be designed with a particular single-mode fiber stub that enables the devices to perform their desired function with each of the following multimode optical fiber types: OM1, OM2, OM3, OM4, and OM5 multimode optical fiber.

According to one embodiment, a device for the the system referred to in the preceding paragraph comprises a single-mode fiber stub having a mode field diameter within 20% of a mode field diameter of a fundamental mode of OM1, OM2, OM3, OM4, and OM5 multimode optical fiber at the operating wavelength. The single-mode fiber stub also has a fiber cutoff wavelength below the operating wavelength. The device also comprises a ferrule to which the single-mode fiber stub is secured. The ferrule includes a front end that presents the single-mode fiber stub for optical coupling and a back end opposite the front end. A center of a core of the single-mode fiber stub is within 0.5 µm of a center of the ferrule at the front end of the ferrule.

The device of the preceding paragraph may be a fiber optic connector that further comprises a connector body that includes the ferrule. In such an embodiment, the single-mode fiber stub may extend beyond the back end of the ferrule and have a splice end that is located within the connector body so that a splice joint is capable of being formed with the multimode optical fiber within the connector body. In some embodiments where the device is a fiber optic connector, the device may further comprise a strain relief positioned over a portion of the connector body, wherein the strain relief has a color for OM1, OM2, OM3, or OM4 multimode optical fiber cabling according to ANSP-TIA-568.3-D-5.2.3 (2016), and wherein the connector body has a color for single-mode optical fiber cabling according to ANSI/TIA-568.3-D-5.2.3 (2016). Additionally, in some embodiments where the device is a fiber optic connector, the mode field diameter of the single-mode fiber stub at the splice end may be between 12-16 µm at an operating wavelength of 1310 nm.

The device of the second paragraph in this Summary section may alternatively be a fiber optic adapter that further comprises an adapter body that includes the ferrule. In such an embodiment, the single-mode fiber stub extends to the back end of the ferrule, and the fiber optic adapter defines a male connection interface that includes the front end of the ferrule and a female connection interface that includes the back end of the ferrule.

Embodiments are also disclosed where the device of the second paragraph in this Summary section is an optical transceiver that further comprises: a housing; an optical-electronic sub-assembly within the housing configured for single-mode transmission at the operating wavelength; and a female connection interface that includes the front end of the ferrule. In such embodiments, the single-mode fiber stub extends from the back end of the ferrule and is optically coupled to the optical-electronic sub-assembly within the housing. The female connection interface may be configured to accept a duplex connector, such as an LC duplex connector according to IEC 61754-20:2012, or a multi-fiber connector, such as a MPO connector according to IEC 61754-7-3:2019.

The devices according to any of the preceding paragraphs may include the single-mode fiber stub having a length between 0.5 cm and 2.0 cm in some embodiments, or between 0.5 cm and 1.5 in some embodiments. Additionally, in some embodiments, the devices according to any of the preceding paragraphs may include the single-mode fiber stub having a fiber cutoff wavelength below 1100 nm. Additionally, in some embodiments, the devices according to any of the preceding paragraphs may include the single-mode fiber stub having a first end at the front end of the ferrule and a second end opposite the first end, wherein the mode field diameter of the single-mode fiber stub is larger at the first end than the second end such that the single-mode fiber stub comprises a mode field transformation.

Fiber optic systems including one or more devices according to the preceding paragraphs are also disclosed. According to one embodiment, such a fiber optic system is configured for transmission of an optical data signal at an operating wavelength. The firber optic system comprises at least one fiber optic cable assembly that includes a multimode optical fiber having a mode field diameter of a fundamental mode at the operating wavelength. The fiber optic system also comprises a device according to any of the preceding paragraphs, wherein the single-mode fiber stub of the device forms an optical connection with the multimode optical fiber of the at least one fiber optic cable assembly, and wherein the center of the core of the single-mode fiber stub is within 2 µm of a center of a core of the multimode optical fiber at the optical connection.

Associated methods are also disclosed. According to one embodiment, the disclosure provides a method for upgrading a system that includes at least one link of multimode optical fiber, wherein each link of the at least one link comprises opposed ends terminated with a respective multimode fiber optic connector that presents the multimode optical fiber of the link for optical coupling, and wherein the multimode optical fiber has a mode field diameter of a fundamental mode at an operating wavelength. The method comprises selecting a single-mode fiber stub that satisfies a condition of having a mode field diameter within 20% of the mode field diameter of the fundamental mode of the multimode optical fiber at the operating wavelength, wherein the single-mode fiber stub is selected so that condition can be satisfied for the multimode optical fiber being OM1 multimode optical fiber, OM2 multimode optical fiber, OM3 multimode optical fiber, OM4 multimode optical fiber, and OM5 multimode optical fiber. The method also comprises: selecting a ferrule to support the single-mode fiber stub, wherein the ferrule includes a ferrule bore configured to receive the single-mode fiber stub, and wherein the ferrule is selected so that a ferrule bore eccentricity is <0.5 µm and a diameter of the ferrule bore is within the range of 126±0.5 µm; and providing the ferrule either as part of a replacement fiber optic connector that is intended to replace one of the multimode fiber optic connectors of the link, as part of an adapter that is configured to receive one of the multimode fiber optic connectors of the link, or as part of an optical transceiver that is configured to receive one of the multimode fiber optic connectors of the link, wherein the single-mode fiber stub is secured to the ferrule.

In embodiments of the method using a replacement fiber optic connector, the replacement fiber optic connector further includes a body from which the ferrule extends. The ferrule has a front end that presents the single-mode fiber stub for optical coupling and a back end opposite the front end. The single-mode fiber stub extends beyond the back end of the ferrule. The body of the replacement fiber optic connector is configured to accommodate a splice joint between the single-mode fiber stub and the multimode optical fiber.

In embodiments of the method using an adapter, the ferrule has a front end and a back end opposite the front end. The single-mode fiber stub has a length that is approximately equal to distance between the front end and the back end of the ferrule such that the ferrule presents opposite ends of the single-mode fiber stub for optical coupling. The adapter defines a male connection interface that includes the front end of the ferrule and a female connection interface that includes the back end of the ferrule.

In embodiments of the method using an optical tranceiver, the optical transceiver further includes housing and an optical-electronic sub-assembly within the housing configured for single-mode transmission at the operating wavelength. The ferrule has a front end that presents the single-mode fiber stub for optical coupling and a back end opposite the front end, the single-mode fiber stub extends beyond the back end of the ferrule and is optically coupled to the optical-electronic sub-assembly within the housing, and the housing and the front end of the ferrule define a female connection interface.

An additional embodiment of the disclosure relates to a method including removing a first multimode fiber optic connector at a first end of a fiber optic cable of a first fiber optic cable assembly. The fiber optic cable of the first fiber optic cable assembly includes a multimode optical fiber. The multimode optical fiber has a mode field diameter of a fundamental mode at an operating wavelength. The method further includes replacing the first multimode fiber optic connector of the first fiber optic cable assembly with a replacement first fiber optic connector at the first end of the fiber optic cable of the first fiber optic cable assembly. The replacement first fiber optic connector includes a first single-mode fiber stub that forms a first splice joint with the multimode optical fiber of the first fiber optic cable assembly. The first single-mode fiber stub of the first fiber optic cable assembly includes a mode field diameter within 20% of the mode field diameter of the fundamental mode of the multimode optical fiber of the first fiber optic cable assembly at the operating wavelength. The first single-mode fiber stub of the first fiber optic cable assembly includes a fiber cutoff wavelength below the operating wavelength. The method further includes removing a second multimode fiber optic connector at a second end of a fiber optic cable of a second fiber optic cable assembly. The fiber optic cable of the second fiber optic cable assembly includes a multimode optical fiber. The multimode optical fiber has a mode field diameter of a fundamental mode at the operating wavelength. The method further includes replacing the second multimode fiber optic connector of the second fiber optic cable assembly with a replacement second fiber optic connector at the second end of the fiber optic cable of the second fiber optic cable assembly. The replacement second fiber optic connector includes a second single-mode fiber stub that forms a second splice joint with the multimode optical fiber of the second fiber optic cable assembly. The second single-mode fiber stub of the second fiber optic cable assembly includes a mode field diameter within 20% of the mode field diameter of the fundamental mode of the multimode optical fiber of the second fiber optic cable assembly at the operating wavelength. The second single-mode fiber stub of the second fiber optic cable assembly includes a fiber cutoff wavelength below the operating wavelength. The method further includes connecting the replacement first fiber optic connector of the first fiber optic cable assembly with the second fiber optic connector of the second fiber optic cable assembly such that the first single-mode fiber stub of the first fiber optic connector of the first fiber optic cable assembly is aligned and in optical communication with the second single-mode fiber stub of the second fiber optic connector of the second fiber optic cable assembly at a fiber optic connection.

An additional embodiment of the disclosure relates to a method of upgrading a system having links of multimode optical fibers connected in series. Each of the links includes opposed ends terminated with a respective multimode fiber optic connector that presents the multimode optical fiber of the link for optical coupling. The method includes replacing all of the multimode fiber optic connectors with respective replacement fiber optic connectors, wherein the replacing does not involve removing all of the multimode optical fibers such that following the replacing, at least several of the links include the multimode optical fiber of the respective link being terminated with the respective replacement connectors. The method further includes connecting each of the replacement fiber optic connectors to another one of the replacement fiber optic connectors through a physical contact connection. The connecting results in no multimode optical fiber in the system being directly coupled to another multimode optical fiber in the system through a physical contact connection.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
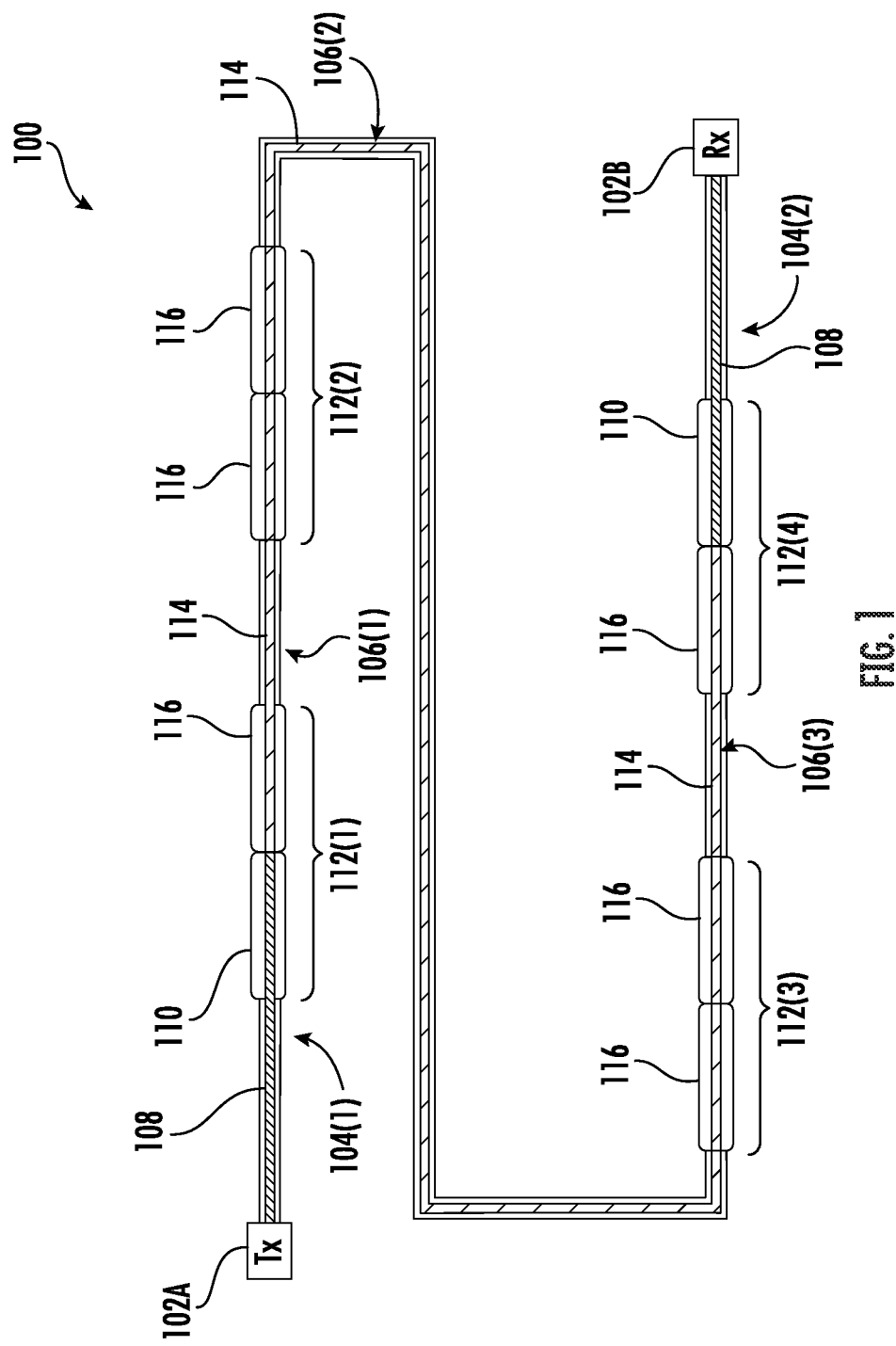
FIG. 1 is a diagram of a fiber optic system including multimode optical fiber cables and fiber connections with multimode fiber connectors.

Reference will now be made in detail to the presently preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

REFERENCE NUMBERS AND TERMINOLOGY

The use herein of ordinals in conjunction with an element is solely for distinguishing what might otherwise be similar or identical labels, such as "first fiber optic cable" and "second fiber optic cable," and does not imply a priority, a type, an importance, or other attribute, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. As an example, the recitation of A or B means A, or B, or both A and B.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated, and the embodiments may be in other orientations in use. Further, as used herein, the terms "horizontal," "parallel," "perpendicular," "vertical," "lateral," etc., including slight variations that may be present in working examples.

As used herein, the terms "optical communication," "in optical communication," and the like mean that two elements are arranged such that optical signals are passively or actively transmittable therebetween via a medium, such as but not limited to, an optical fiber, connectors, free space, index-matching structure or gel, reflective surface, or other light directing or transmitting means.

In this disclosure, the abbreviations "SMF" and "MMF" are sometimes used as shorthand for single-mode optical fiber and multimode optical fiber, respectively. These abbreviations are sometimes used as part of a term/phrase for an element associated with such optical fibers. For example, the term "fiber optic connector" is sometimes referred to in this disclosure as an "SMF connector" or an "MMF connector," depending on the type of optical fiber that the fiber optic connector presents for optical coupling at an end face of the fiber optic connector.

As used herein, fiber core-to-ferrule eccentricity (or simply "core-to-ferrule" eccentricity) refers to the positional relationship between the center of a core of an optical fiber relative to a geometric center of a ferrule to which the optical fiber is secured. Similarly, "ferrule hole eccentricity" or "ferrule bore eccentricity" refers to the positional relationship between the center of a ferrule hole/bore relative to the geometric center of the ferrule.

In this disclosure, for convenience, discussions about the center of an optical fiber assume that the center of the core of the optical fiber is the same as the center of the optical fiber as defined by the cladding (i.e., no core-to-cladding eccentricity). Skilled persons will appreciate that embodiments are possible where there is core-to-cladding eccentricity, and that the discussion of about the "center" of an optical fiber in this disclosure actually refers to the center of the core of the optical fiber.

Fiber Optic System with Multimode Connections

FIG. 1 is a diagram of a fiber optic system 100, including multimode optical fiber cables and fiber connections with multimode fiber optic connectors. In particular, the fiber optic system 100 includes a single-mode transmitter (Tx) 102A that emits modulated light and a single-mode receiver (Rx) 102B that receives the modulated light. In certain embodiments, the fiber optic system 100 includes single-mode fiber optic cable assemblies 104(1), 104(2) (referred to generally as SMF cable assemblies 104) at the transmitter and receiver, and multimode fiber optic cable assemblies 106(1)-106(3) (referred to generally as MMF cable assemblies 106) therebetween. In certain embodiments, the transmitter 102A includes an LR or LR4 transceiver. For an LR4 transceiver, four wavelengths are co-propagating within the same optical fiber to reach an aggregated data rate of 40 Gb/s. In certain embodiments, the transmitter 102A (e.g., silicon-photonics-based transmitter) emits modulated light having a wavelength in the range from 800 nm to 1650 nm (e.g., 1300 nm).

The SMF cable assemblies 104(1) include single-mode optical fiber 108 and at least one fiber optic connector 110 (also referred to as "SMF connectors 110") at least partially forming fiber connections 112(1)-112(4) (referred to generally as fiber connections 112). The MMF cable assemblies 106 include multimode optical fiber 114 and a plurality of fiber optic connectors 116 (also referred to as "MMF connectors 116") at least partially forming fiber connections 112. In particular, MMF connectors 116 fully form fiber connections 112(2), 112(3). In certain embodiments, the multimode optical fiber 114 has a refractive index profile designed to optimally operate around a nominal wavelength of 850 nm, e.g., 840 to 860 nm (i.e., has an operating wavelength of 850 nm where mode dispersion is minimum) or at a wavelength in the range from 800 nm to 1600 nm.

Multimode optical fiber 114 may be widely deployed in local area networks (e.g., campus, hotels, office buildings, data centers, etc.). Many legacy installations only needed to support transceiver speed of 1 Gbps using OM1 multimode optical fiber, which has a core delta of 2% and/or core diameter of 62.5 µm. More recent installations may use OM2, OM3, or OM4 multimode optical fiber, which have a core delta of 1% and/or a core diameter of 50 µm. The modal bandwidth of the installed optical fibers presents a difficult hurdle to upgrading the network to higher speeds. Further, existing multimode optical fiber 114 in legacy installations is difficult to replace due to cost and disruptions. Instead of replacing multimode optical fiber 114, signals may instead be transmitted through the fundamental mode of multimode optical fiber 114. With only one mode propagating in multimode optical fiber 114, the modal bandwidth problem is reduced (or eliminated).

At 1310 nm, the mode field diameter (MFD) of the fundamental mode of multimode optical fiber is 13.6 µm for OM1 multimode optical fiber and 14.5 µm for OM2, OM3, and OM4 multimode optical fiber. By comparison, at 1310 nm, the mode field diameter is around 9.2 µm for standard single-mode fiber. By comparison, at 1550 nm, the mode field diameter of the fundamental mode for OM1 multimode optical fiber is 14.85 µm and 15.8 µm for OM2, 0M3, and OM4 multimode optical fiber. By comparison, at 1550 nm, the mode field diameter is around 10.3 µm for standard single-mode optical fiber. To efficiently launch light from the single-mode optical fiber 108 into the fundamental mode of the multimode optical fiber 114, the mode field diameter of the single-mode optical fiber 108 needs to be increased to substantially match the fundamental mode of multimode optical fiber 114.

Generally, current solutions directly connect to existing MMF connectors 116 in the field. However, ferrules for MMF connectors 116 in the field (i.e., in an installed system) vary widely in quality, such as material (stainless steel, composite polymer, zirconia ceramic), geometric tolerances (which are more relaxed for MMF ferrules compared to SMF ferrules), etc. Further, using existing MMF connectors 116 incurs significant insertion loss because MMF connectors 116 have a wide distribution of fiber core-to-ferrule eccentricity and hence a spread of insertion loss even when mating to a SMF connector 110 that terminates a single-mode optical fiber with an increased mode field diameter. The loss of single-mode optical power will excite high-order modes in the multimode optical fiber 114, causing further degradation in transmission performance.

Fiber Optic System with Single-Mode Connections

Figure 2:
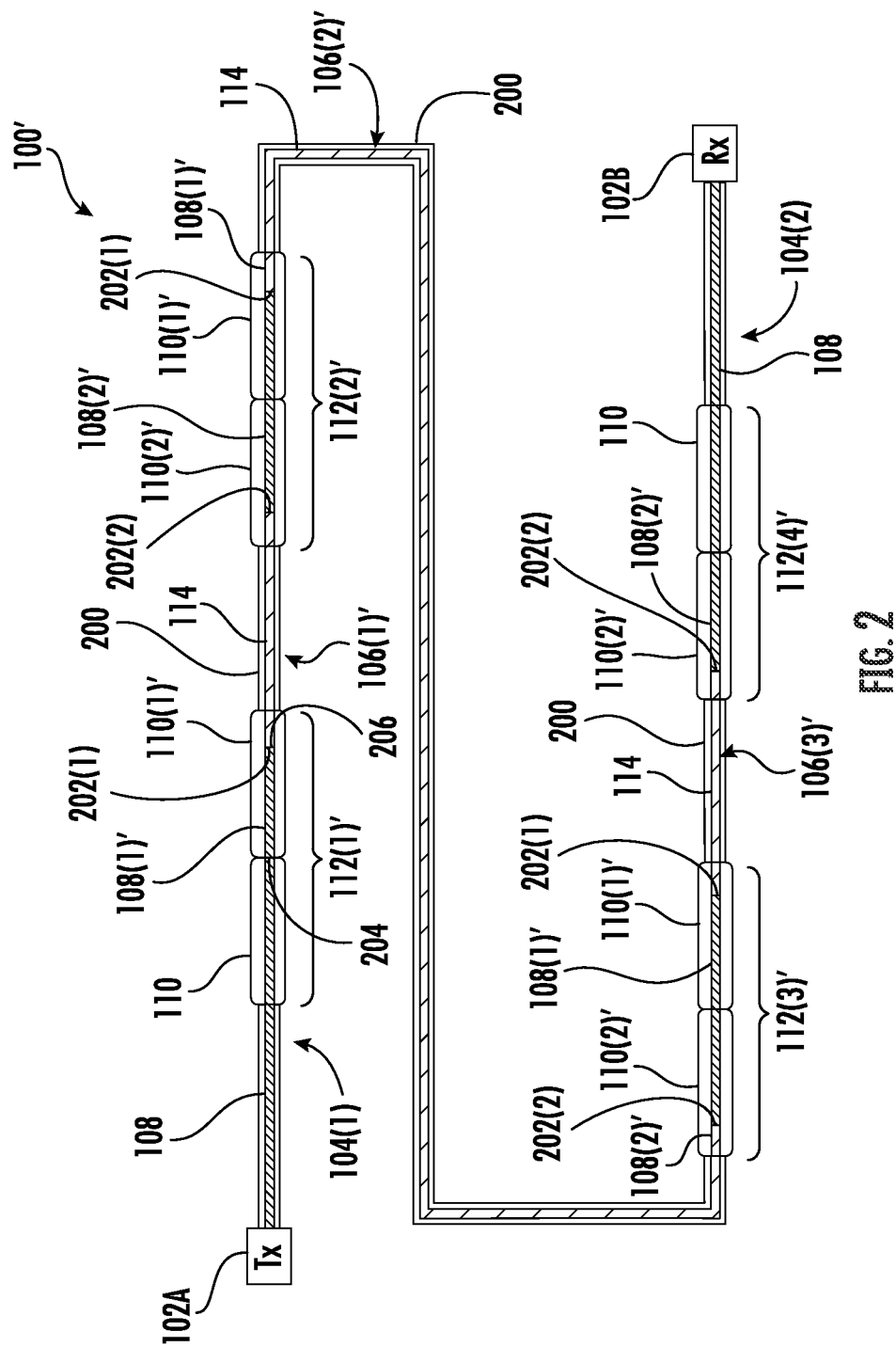
FIG. 2 is a diagram of a fiber optic system including multimode optical fiber cables and fiber connections with mode-matching single-mode fiber connectors.

FIG. 2 is a diagram of a fiber optic system 100' including multimode optical fibers 114 and fiber connections 112' with fiber optic connectors 110, 110' that are associated with a single-mode optical fiber. In particular, as noted above, with respect to FIG. 1, the fiber optic connectors 110 are part of respective SMF cable assemblies 104. FIG. 2 introduces the fiber optic connectors 110', which include respective single-mode optical fiber stubs 108' (referred to herein as SMF stubs 108'), as will be described in greater detail below. Similar to the fiber optic connectors 110, the fiber optic connectors 110' are also referred to as SMF connectors 110' in this disclosure.

In certain embodiments, the fiber optic system includes MMF connectors 116 (see FIG. 1) replaced with SMF connectors 110' at each fiber connection 112'. In other words, all the MMF connectors 116 are replaced with SMF connectors 110'. In particular, in certain embodiments, MMF connectors 116 are removed from outlet panels, patch panels, etc., and/or cut off from the cables that carry the multimode optical fibers 114. The multimode optical fibers 114 are prepared by removing a predetermined length of jacket from the associated cable and thereafter removing any coating from the multimode optical fibers 114. The resulting exposed, bare multimode optical fiber 114 is cleaned and cleaved to a predetermined length. The SMF connector 110' is then installed by mechanical splicing or fusion splicing the SMF stubs 108' to the bare multimode optical fiber 114.

Accordingly, the cables are re-terminated using field-installable SMF connectors 110' (e.g., mechanical splice connectors such as UniCam® connectors from Corning Optical Communications LLC, fusion splice connectors such as FuseLite® connectors from Corning Optical Communications LLC, etc.), with the SMF stubs 108' functioning to provide modal conversion, modal conditioning, and/or modal filtering.

Due to lower fiber core-to-ferrule offsets in SMF connectors 110', the coupling loss and multi-path interference (MPI) are reduced compared to legacy MMF connectors 116. In particular, the connector center to center offset between a pair of SMF connectors 110' is less than or equal to 2.5 microns. As noted above, loose geometric tolerance of MMF connectors 116 provides high probability of insertion loss and multi-path interference. Additionally, in certain embodiments, accessible multimode optical fiber cable assemblies are replaced by single-mode optical fiber cable assemblies. Replacing pre-installed MMF connectors 116 with SMF connectors 110' reduces the loss budget for a single multimode fiber span by 3.7 dB, for example. For structured cable systems with multiple spans of multimode optical fiber 114, the improvement is even larger.

With this in mind, and referring back to FIG. 2, the fiber optic system 100' includes at least one fiber optic cable assembly 106'. The fiber optic cable assemblies 106' define at least a portion of an optical path between a transmitter 102A and a receiver 102B. Each of the fiber optic cable assemblies 106' includes a fiber optic cable 200, a first SMF connector 110(1)', and a second SMF connector 110(2)'. The fiber optic cable 200 includes a multimode optical fiber 114 for communication of an optical data signal at an operating wavelength (e.g., 1310 nm, 1550 nm, etc.). The multimode optical fiber 114 includes a mode field diameter for a fundamental mode at the operating wavelength. The first SMF connector 110(1)' is at a first end of the fiber optic cable 200, and the second SMF connector 110(2)' is at a second end of the fiber optic cable 200. The first SMF connector 110(1)' includes a first SMF stub 108(1)' that forms a first splice joint 202(1) (e.g., mechanical splice or fusion splice) with the multimode optical fiber 114 of the fiber optic cable assembly 106'. The second SMF connector 110(2)' includes a second SMF stub 108(2)' that forms a second splice joint 202(2) (e.g., mechanical splice or fusion splice) with the multimode optical fiber 114 of the fiber optic cable assembly 106'.

Each of the SMF stubs 108(1)', 108(2)' includes a mode field diameter within 20% of the mode field diameter of the fundamental mode of the multimode optical fiber 114 of the first fiber optic cable assembly 106' at the operating wavelength. Such similarity in size for mode field diameter is considered to be "mode-matching" in this disclosure. In certain embodiments, the SMF stubs 108' roughly match the mode field diameter of the LP01 mode of OM1, OM2, OM3, OM4, and/or OM5 multimode optical fiber. More specifically, each of the SMF connectors 110' has an SMF stub 108' with a mode field diameter closely matched to that of the LP01 mode of the multimode optical fiber 114, which may be around 14 µm at 1310 nm, or around 15 µm at 1550 nm. Each of the mode-matching SMF stubs 108' includes a fiber cutoff wavelength below the operating wavelength. In certain embodiments, the operating wavelength is 1310 nm. In certain embodiments, each of the SMF connectors 110' has an SMF stub 108' having a cutoff length less than 1200 nm and even less than 1100 nm in some embodiments. Each SMF stub 108' may have a mode field diameter transitioned from 9.2 µm at an end of a ferrule of the associated SMF connector 110' to a larger value (e.g., 11.3 μm or 14 μm at 1310 nm) at an opposite end of the SMF stub 108' (e.g., through a single stub fiber or through multiple stub fibers). Each of the SMF stubs 108' includes a fiber cutoff wavelength below the operating wavelength. In certain embodiments, the operating wavelength is 1310 nm. In one embodiment, a mode field diameter of an end of the first SMF stub 108'(1) of the first fiber optic cable assembly 106' proximate the multimode optical fiber 114 of the first fiber optic cable assembly 106' is between 12-16 μm at 1310 nm wavelength (e.g., about 14 μm at 1310 nm wavelength). In certain embodiments, the first SMF stub 108'(1) of the first fiber optic cable assembly 106' has a length of at least 0.5 mm, a fiber cutoff wavelength below 1100 nm, and/or a mode field transformation. In certain embodiments, the first SMF stub 108'(1) of the fiber optic cable assembly 106' includes a 14 μm mode field diameter at 1310 nm wavelength at a first end 204 opposite the multimode optical fiber 114' of the fiber optic cable assembly 106', a 9.2 μm mode field diameter at 1310 nm wavelength at a second end 206 proximate the multimode optical fiber 114 of the fiber optic cable assembly 106', and/or an adiabatic transition length of at least 0.5 mm.

In certain embodiments, the multimode optical fiber 114 has a core delta around 1%, a core diameter around 50 microns, and a mode field diameter for LP01 mode of 14.5 μm at 1310 nm and/or 15.8 μm at 1550 nm. In certain embodiments, the multimode optical fiber 114 is a universal fiber having a multimode core with the mode field diameter for the fundamental mode similar to that of a standard single-mode fiber.

When the SMF stub 108' is used as a modal-converting fiber, the purpose is to primarily excite the fundamental mode of the multimode optical fiber 114. To optimize launch of the fundamental mode, the core diameter $D_C$ and core delta $\Delta_0$ of the SMF stub 108' should be chosen such that the mode field diameter of the SMF stub 108' is close to the fundamental mode of the multimode optical fiber 114. Therefore, in one example, the range of the core diameter $D_C$ of the SMF stub 108' is 9 μm≤$D_C$≤12 and in another example is 7 μm≤$D_C$≤15 μm. Also, in an example, the core delta ($\Delta_0$) is in the range from 0.1% to 0.25%, and in another example, between 0.07% and 0.5%. In certain embodiments, the SMF stub 108' can be a bend-insensitive fiber. Some of the design examples for the SMF stubs 108' are shown in the table below.

range from 6 microns to 15 microns. In other embodiments, $D_C$≤50 microns. Examples 1 and 2 in table 1 above have graded index profiles.

As shown in FIG. 2, SMF stub 108(1)' of the first SMF connector 110(1)' of one fiber optic cable assembly 106(3) is aligned and in optical communication (e.g., direct optical communication) with the second SMF stub 108(2)' of the second fiber optic connector 110(2)' of another fiber optic cable assembly 106(2) at a fiber optic connection 112(2)'.

Accordingly, the optical path includes a plurality of multimode optical fibers 114 and a plurality of SMF connectors 110, 110' between the transmitter 102A and the receiver 102B. Each of the SMF connectors 110 present a respective single-mode optical fiber 108 for optical coupling, and each of the SMF connectors 110' presents an SMF stub 108' for optical coupling. In certain embodiments, the multimode optical fiber 114 of the fiber optic cable assembly 106' comprises at least one of OM1, OM2, OM3, and/or OM4 multimode optical fiber. The SMF stub 108' is configured to propagate an optical data signal at an operating wavelength for a plurality of different types of multimode optical fiber (e.g., OM1, OM2, OM3, and/or OM4) such as, for example, OM1 and OM2 optical fibers.

Figure 3:
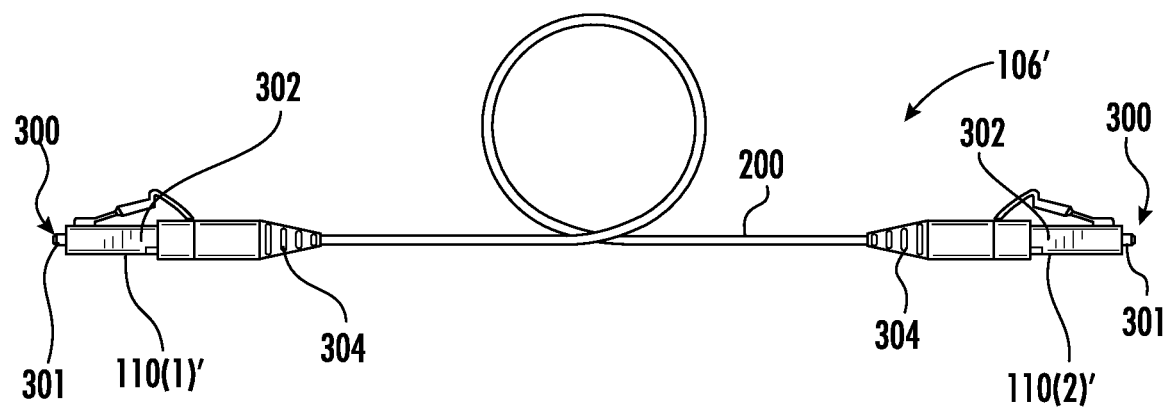
FIG. 3 is a side view of a fiber optic cable assembly with a multimode optical fiber and fiber optic connectors that each include a mode-matching single-mode fiber stub.

FIG. 3 is a side view of a fiber optic cable assembly 106' with a multimode optical fiber 114 (see FIG. 2) and SMF connectors 110' each including a respective SMF stub 108' (see FIG. 2).

As noted above, the fiber optic cable assembly 106' includes a fiber optic cable 200 (e.g., multi-fiber backbone cable, multimode horizontal distribution cable, etc.), a first SMF connector 110(1)', and a second SMF connector 110(2)'. The fiber optic cable 200 includes a multimode optical fiber 114. The first SMF connector 110(1)' is at a first end of the fiber optic cable 200, and the second SMF connector 110(2)' is at a second end of the fiber optic cable 200. The first fiber optic connector 110(1)' includes a first SMF stub 108(1)' that forms a first splice joint 202(1) (see FIG. 2) (e.g., mechanical splice, fusion splice) with the multimode optical fiber 114 of the fiber optic cable assembly 106'. The second fiber optic connector 110(2)' includes a second SMF stub 108(2)' that forms a second splice joint 202(2) (e.g., mechanical splice, fusion splice) with the multimode optical fiber 114 of the fiber optic cable assembly 106'. Each of the fiber optic connectors 110', defines a single-mode interface 300 for each end of the fiber optic cable assembly 106' (and,

TABLE 1

| Example | 1 | 2 | 3 | 4 | 5 | 6 | 7 | 8 | 9 |
|---|---|---|---|---|---|---|---|---|---|
| core delta | 0.15 | 0.125 | 0.177 | 0.145 | 0.143 | 0.13 | 0.125 | 0.117 | 0.218 |
| core radius (μm) | 6 | 6 | 4.95 | 5.7 | 5.55 | 6 | 5.7 | 6.2 | 4.4 |
| alpha | 3 | 7 | 20 | 20 | 20 | 20 | 20 | 20 | 20 |
| cutoff (nm) | 940 | 989 | 1057 | 1100 | 1064 | 1095 | 1023 | 1074 | 1043 |
| MFD at 1310 nm (μm) | 13.75 | 14.41 | 12.08 | 13.42 | 13.45 | 14.07 | 14.23 | 14.79 | 10.87 |
| MFD at 1550 nm (μm) | 16.92 | 17.44 | 14.4 | 15.82 | 16 | 16.56 | 17.07 | 17.49 | 13 |

When the mode field diameter of the LP01 mode of OM1 and OM2 multimode optical fiber are roughly matched at 1310 nm, the mode field diameter of the LP01 mode at 1550 nm for these fibers is also roughly matched. Therefore, the same mode match for a single-mode optical fiber is also applicable for LP01 transmission of OM1, OM2, etc., around 1550 nm using single-mode transceivers.

In some other embodiments, the SMF stub 108' can be gradient index (GRIN) fiber with an alpha profile having a core delta $\Delta_0$ in the range from 0.1% to 0.6% (e.g., 0.1% to 0.25%), and the aforementioned core diameter $D_C$ in the therefore, each end of the multimode optical fiber 114 within the fiber optic cable assembly 106').

In certain embodiments, MMF connectors 116 are cut off from the fiber optic cable 200, and replacement SMF connectors 110' are installed at both ends of the fiber optic cable 200 in the field. In certain embodiments, the SMF connectors 110' can be connected to other single-mode cable assemblies or directly connected to single-mode transceivers for upgrading to higher transmission speeds of 10G and beyond.

The first SMF connector 110(1)' and the second SMF connector 110(2)' each include a ferrule 301, a body 302 (which may be one or multiple parts) from which the ferrule 301 extends, and a strain relief 304 positioned over a portion of the body 302 and a portion of the fiber optic cable 200. The first SMF stub 108' is secured to the ferrule 301. The ferrule 301 includes a front end that presents the first SMF stub 108' for optical coupling and a back end opposite the front end. The first SMF stub 108' extends beyond the back end of the ferrule so that the splice joint 202 with the multimode optical fiber 114 is located within the body 302. Although the SMF connectors 110' are shown in the form LC connectors (e.g., according to IEC 61754-20:2012), this disclosure may apply to other connector types such as SC (e.g., according to IEC 61754-4:2013) and ST (e.g., according to TIA/EIA 604-2:2004). Both mechanical splice and fusion splice-on forms of these connector types and others are possible.

The strain relief 304 has a color for OM1, OM2, OM3, or OM4 fiber cabling, and/or the body 302 has a color for single-mode fiber cabling according to ANSPTIA-568.3-D-5.2.3 (2016). With this color definition, users can clearly distinguish the fiber type for the end face of the fiber optic connector 300 and the fiber type of the fiber optic cable 200.

TABLE 2

| Cable | OM1 | OM2 | OM3 | OM4 |
|---|---|---|---|---|
| Connector body | Blue for UPC end face, Green for APC end face | | | |
| Connector boot | Beige | Black | Aqua | Aqua |
| Cable | Orange | Orange | Aqua | Aqua/Violet |

Figure 4A:
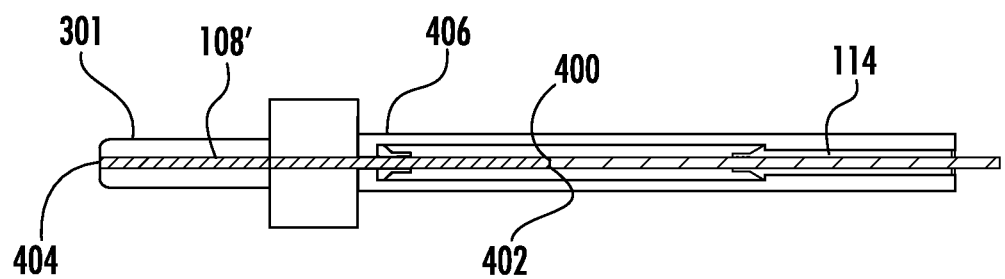
FIG. 4A is a cross-sectional side view of one embodiment of a portion of the fiber optic connector of FIG. 3.

FIG. 4A is a schematic cross-sectional side view of one embodiment of a portion of the SMF connector 110' of FIG. 3. As similarly noted above, in certain embodiments, the original MMF connector 116 is cut off, the multimode optical fiber 114 is stripped and cleaved to form an end face 400, which is connected to an end face 402 of the SMF stub 108' through a mechanical splice (e.g., within a splice holder 406 inside the body 302 (FIG. 3)). The lateral cladding offsets between the optical fibers are aligned to less than 1 µm in a v-groove of a splice part within the splice holder 406. In certain embodiments, the gap between the fiber end faces 400, 402 may be filled with index matching material (e.g., index matching gel). Alternatively, the SMF stub 108' is fusion spliced to the multimode optical fiber 114, resulting in an even smaller insertion loss (and no index matching gel is required). In certain embodiments, the splice and the SMF stub 108' are kept straight using a splice protector.

The mode field diameter of the SMF stub 108' at the splice end closely matches the mode field diameter of the fundamental mode (LP01) of the multimode optical fiber 114 at an operating wavelength. At an operating wavelength of 1310 nm, the mode field diameter of the LP01 mode of OM1 multimode optical fiber is 13.6 µm, while for OM2, 0M3, and OM4 multimode optical fiber, the mode field diameter of the LP01 mode is 14.5 µm. In certain embodiments, the SMF stub 108' has a mode field diameter of between 12-16 µm, such as between 13-15 µm, and particularly around 14.0 µm as a common fiber that can interface with all common types of multimode optical fiber (i.e., OM1, OM2, OM3, and OM4). The mode field mismatch is very small, and the insertion loss is negligible. The SMF stub 108' has a fiber cutoff wavelength below 1200 nm, or optionally below 1100 nm so that high order modes are attenuated in a very short propagation length. In certain embodiments, the mode field diameter of the multimode optical fiber 114 can be matched through several SMF stubs 108' as a bridge to follow the mode field diameter transition. The bridge functioning in a straight orientation and housed as a stub fiber allows very compact use and tight integration with the field-installable connectors and cable assemblies. When the mode field diameter of the fundamental mode (LP01) of OM1, OM2, OM3, and OM4 multimode optical fiber is roughly matched with the mode field diameter of the SMF stub 108' around 1310 nm, the mode field diameter for the LP01 mode around 1550 nm is also roughly matched with the mode field diameter of the SMF stub 108'. The typical wavelength range used around 1550 nm is called C-band, which is between 1530 nm and 1565 nm.

If the SMF stub 108' has a uniform core, the mode field diameter at a connector end face 404 (defined by the ferrule 301) may be 14 µm in some embodiments, which is substantially different from that of standard single-mode optical fiber. To reduce the mode field diameter mismatch to standard single-mode optical fiber, the SMF stub 108' at the connector end face 404 is preferred to have a mode field diameter matching that of standard single-mode optical fiber, which is 9.2 µm at 1310 nm. Such a mode field transforming and SMF stub 108' can be fabricated using a low cutoff SMF stub 108' for standard field-installable connectors, as such SMF stubs 108' are available with a mode field diameter of 9.2 µm.

Figure 4B:
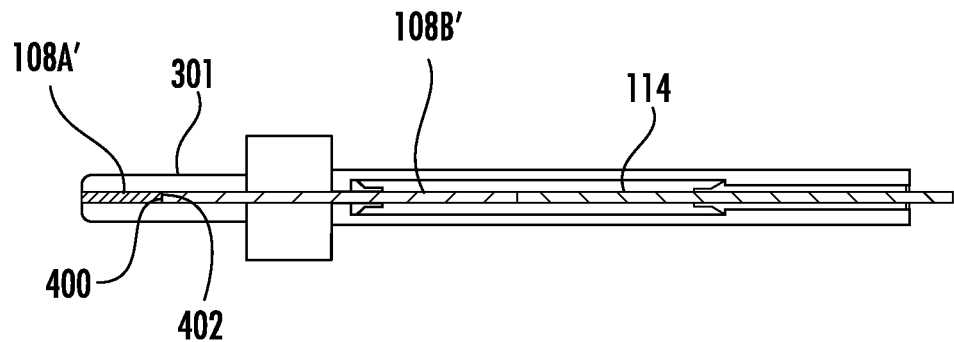
FIG. 4B is a cross-sectional side view of another embodiment of a portion of the fiber optic connector of FIG. 3.

FIG. 4B is a cross-sectional side view of another embodiment of a portion of the SMF connector 110' of FIG. 3. In this embodiment, a very short SMF stub 108A' (length of about 5 mm) includes a mode field diameter transition and is fusion spliced to a second SMF stub 108B' that has a uniform mode field diameter of 14 µm. The fusion splice can be located inside or closely outside the ferrule 301. The benefit of this embodiment is that the first SMF stub 108A' with the transition in mode field diameter can be produced in a batch before assembling into the ferrule 301. In some embodiments, the first SMF stub 108A' may have a uniform mode field diameter of 11.3 µm, and the second SMF stub 108B' may have a uniform mode field diameter of 14 µm. The total insertion loss of the connector interface and the splice interface is 0.38 dB, which is significantly reduced comparing with using a single SMF stub 108A' with a 14 µm mode field diameter.

Figure 4C:
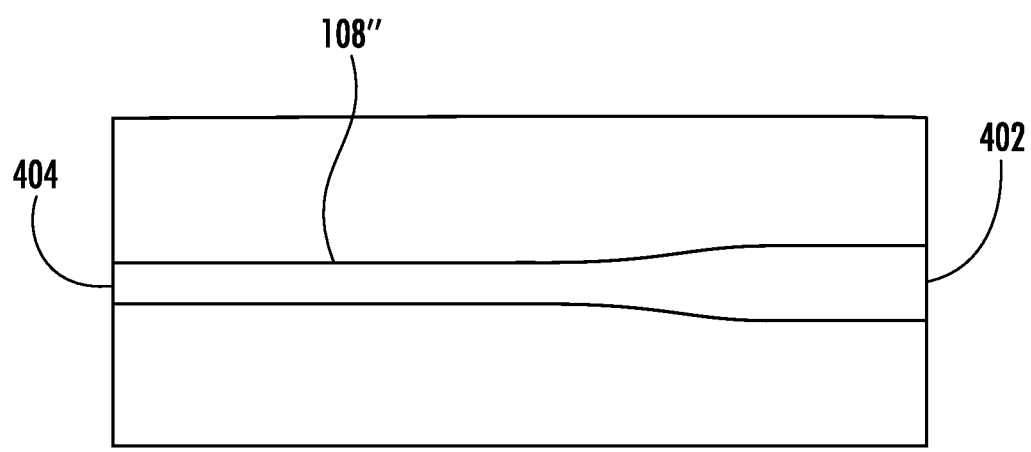
FIG. 4C is a cross-sectional side view of another embodiment of a portion of the fiber optic connector of FIG. 3.

FIG. 4C is a cross-sectional side view of another embodiment of a portion of the fiber optic connector 110' of FIG. 3. In this embodiment, illustrated is an SMF stub 108'' for low loss coupling into the fundamental mode of a multimode optical fiber 114. The SMF sub 108'' adiabatically transitions from one mode field diameter (at the connector end face 404) to another mode field diameter (at a fiber end face 402). In certain embodiments, near the fiber end face 402, the mode field diameter is adiabatically increased to 14 µm. The adiabatic transition length is at least 0.5 mm. The cutoff wavelength at the mode field expanded region is unchanged.

By embedding the SMF stub 108'' inside the body 302 of the SMF connector 110' (and specifically inside the splice holder 406), a very compact form factor is achieved. At the same time, the SMF stub 108'' is protected from bending. In certain embodiments, a standard single-mode fiber pigtail with the fiber end pre-spliced to the SMF stub is spliced to the multimode optical fiber 114 from the field. The splices, along with the SMF stubs 108'', are supported by a rigid housing that is external to the connector.

Figure 5:
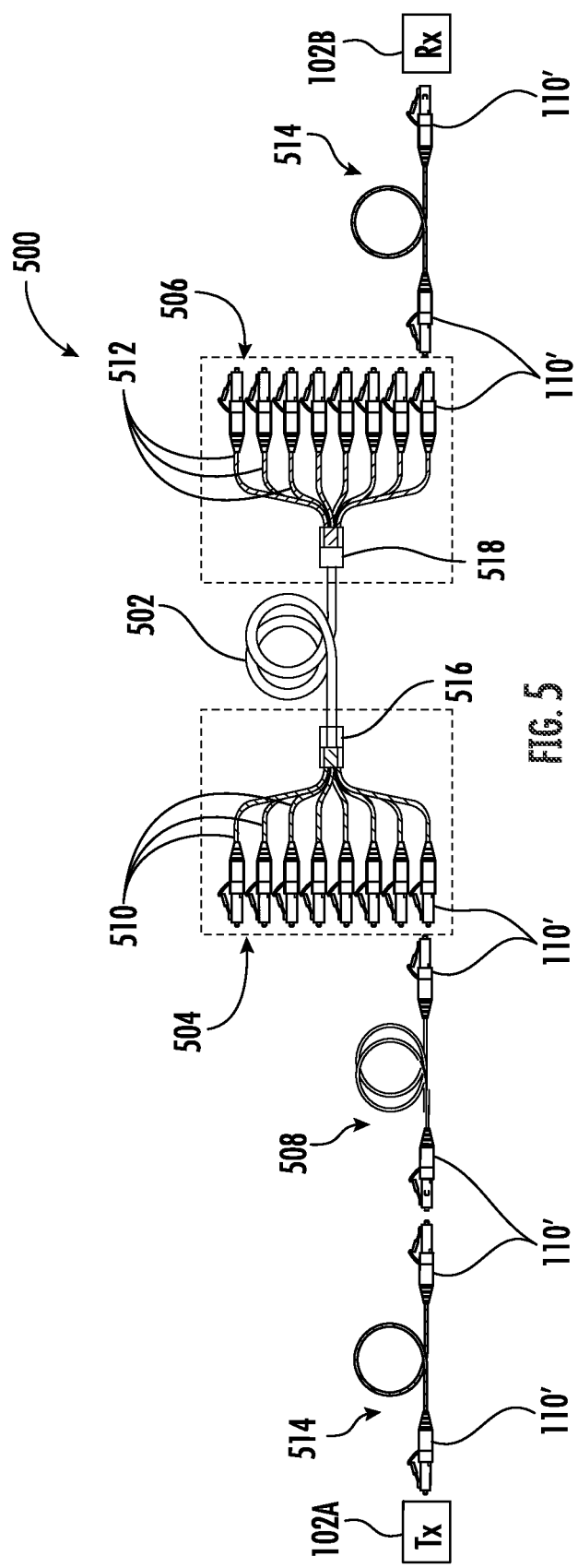
FIG. 5 is a diagram of an embodiment of the fiber optic system of FIG. 2 illustrating fiber connections with mode-matching single-mode fiber connectors.

FIG. 5 is a diagram of a fiber-optic system 500 that serves as an example embodiment of the fiber optic system 100 (FIG. 1), and therefore, an example embodiment of where such a system may be upgraded to the fiber optic system 100' (FIG. 2). In general, the fiber optic system 500 includes at least one high fiber count backbone cable 502 that connects a horizontal cross-connect 504 with a main cross-connect 506 and at least one horizontal distribution cable 508 that connects outlets in user areas to the horizontal cross-connect 504. Multimode optical fiber cables 510, 512 in the horizontal cross-connect 504 and the main cross-connect 506 are preinstalled and can be difficult to remove entirely and replace with cables that consist of single-mode optical fiber. Sometimes the backbone cable 502 cross-connects through an intermediate cross-connect before reaching the horizontal cross-connect 504. The horizontal distribution cable 508 may have a consolidation point. Therefore, there are many mated connector pairs (connector-to-connector interfaces) in an optical path from the transceiver 102A to the transceiver 102B. It is noted that, whether by replacing the entire cable or simply the connector, each of the connectors in the communication path comprises an SMF connector 110'.

To upgrade a structured multimode optical fiber cabling system in a local area network, existing MMF connectors 116 (FIG. 1) on both ends of the horizontal distribution cables 508 are replaced by SMF connectors 110' (FIG. 2) with SMF stubs 108'. Accessible, short multimode optical fiber cable assemblies in patch panels and user areas can be simply replaced by single-mode optical fiber cable assemblies 514. On both ends of the backbone cable 502, the optical fibers may be directly furcated, or mass fusion spliced to breakout panels at horizontal cross-connect 504 and main cross-connect 506, or terminated by multifiber connectors (e.g., MPO connectors according to IEC 61754-7-3:2019), which connect to the multifiber connectors on breakout cassettes. If existing installation uses direct furcation or fusion splicing at furcation points 516, 518, the multimode optical fibers 114 are well aligned, and they support the transmission of fundamental modes with minimum insertion loss and multi-path interference. MPO-based connections can be replaced by mass fusion splicing in the field. Alternatively, the MMF connectors on the backbone cables 502 can be replaced by multifiber versions of field-installable SMF connectors 108', and breakout cassettes with multimode optical fibers are simply replaced by breakout cassettes that use single-mode optical fibers.

As similarly noted above, geometric tolerances for a given connection vary between the SMF stub 108' and the multimode optical fiber 114, as well as between the ferrules 301 of SMF connectors 110, 110' and the ferrules of MMF connectors 116. The ferrules of MMF connectors 116 have approximately 6× larger ferrule hole eccentricity (position of ferrule hole center relative to the geometric center of the ferrule) and 5× looser fit between the ferrule hole and the outer diameter of the multimode optical fiber 114. The quality of the ferrule of the MMF connector 116 significantly impacts the fiber core-to-ferrule eccentricity of the MMF connector 116. Legacy ferrules for MMF connectors 116 made by polymer composite and stainless steel provide even worse geometric tolerances than those of ceramic ferrules.

TABLE 3

|  | Fiber core eccentricity | Fiber OD | Ferrule hole eccentricity | Ferrule hole diameter |
|---|---|---|---|---|
| SMF | <0.5 μm | 125 + 0.7 μm | <1.0 μm | 125.5 μm~126.5 μm |
| MMF | <1.5 μm | 125 + 1.0 μm | <6.0 μm | 127.0 μm~132.0 μm |

A Monte Carlo model based on an IEC single-mode connector insertion loss standard was used to quantify the random mate insertion loss distribution of an SMF connector 110' with SMF stub 108' connecting to the fundamental mode of a multimode optical fiber 114 terminated with a zirconia ceramic MMF ferrule. In this model, assume wavelength is 1310 nm, and mode field diameter is 14.0±0.6 μm, which is closely matched to the mode field diameter of both OM1 and OM2-4 multimode optical fibers. Further, assume the multimode optical fiber 114 has the same outer diameter tolerance as the SMF stub 108', and the MMF ferrule outer diameter has the same tolerance as the SMF ferrule to highlight the effect of the ferrule hole eccentricity and diameter tolerances. The probability distributes for multimode optical fibers, and MMF ferrules are scaled from that of the SMF components according to Table 3.

Figure 6A:
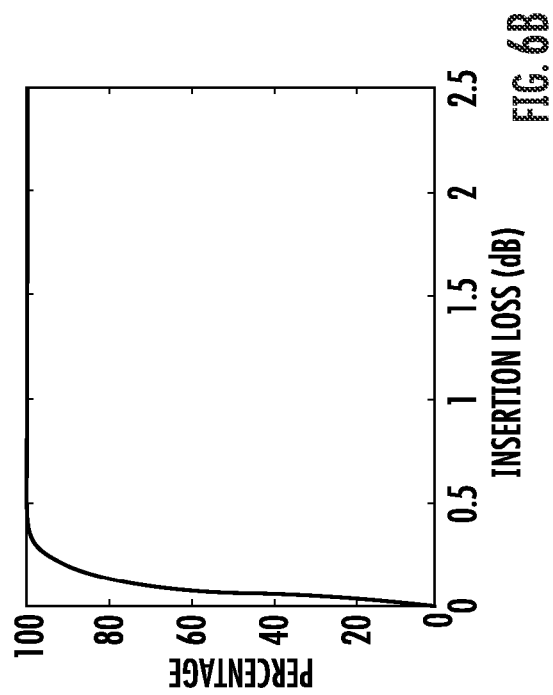
FIG. 6A is a graph of an insertion loss distribution between a multimode fiber connector and a single-mode fiber connector.

FIG. 6A is a graph of an insertion loss distribution between an MMF connector 116 and an SMF connector 110, 110'. In particular, illustrated is the simulated fiber core-to-ferrule eccentricity distribution of the MMF connector 116. The eccentricity extends to 6 μm, largely due to loose tolerances of ferrules for MMF connectors 116. Random mate insertion loss of the connector interface between an OM1 multimode optical fiber in an MMF ferrule and a 14 μm mode field diameter single-mode optical fiber in an SMF ferrule is simulated in FIG. 8. The average insertion loss is 0.53 dB, and the 97% maximum insertion loss is 1.82 dB. The loss is slightly lower for OM2, 0M3, and OM4 fibers, with an average IL of 0.50 dB and 97% maximum of 1.68 dB.

Figure 6B:
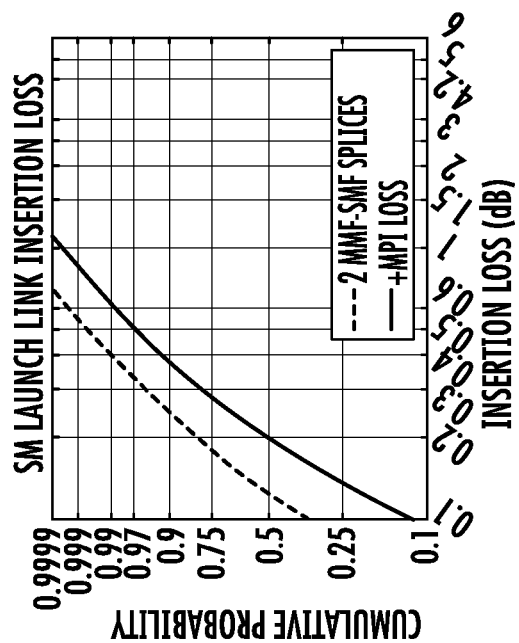
FIG. 6B is a graph of an insertion loss distribution between a multimode fiber and a single-mode fiber stub.

FIG. 6B is a graph of an insertion loss distribution between a multimode optical fiber 114 and an SMF stub 108'. By removing and replacing the MMF connector 116 with an SMF connector 110' with a mechanical splice inside the SMF connector 110', the SMF stub 108' and the multimode optical fiber 114 are aligned to a much higher precision. In particular, FIG. 6B illustrates the insertion loss distribution of the mechanical splice. Average insertion loss is 0.09 dB, and 97% maximum insertion loss is 0.26 dB. Fusion splicing provides even better performance, with an average insertion loss of 0.06 dB and 97% maximum insertion loss of 0.14 dB. The residual insertion loss can be further reduced by closer matching the mode field diameter to the type multimode optical fiber (e.g., OM1, OM2, OM3, or OM4) instead of using an SMF stub 108' with a 14 μm mode field diameter for all types of multimode optical fiber.

Figure 7A:
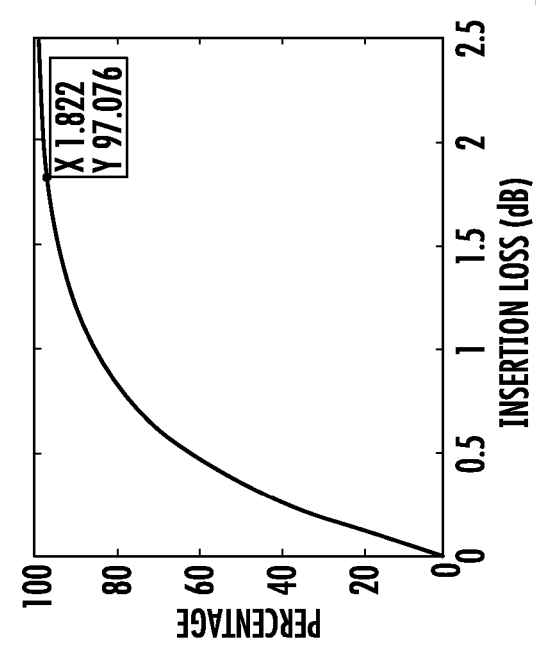
FIG. 7A is a graph of a link loss distribution of a single multimode fiber with two multimode fiber to single-mode fiber connectors.
Figure 7B:
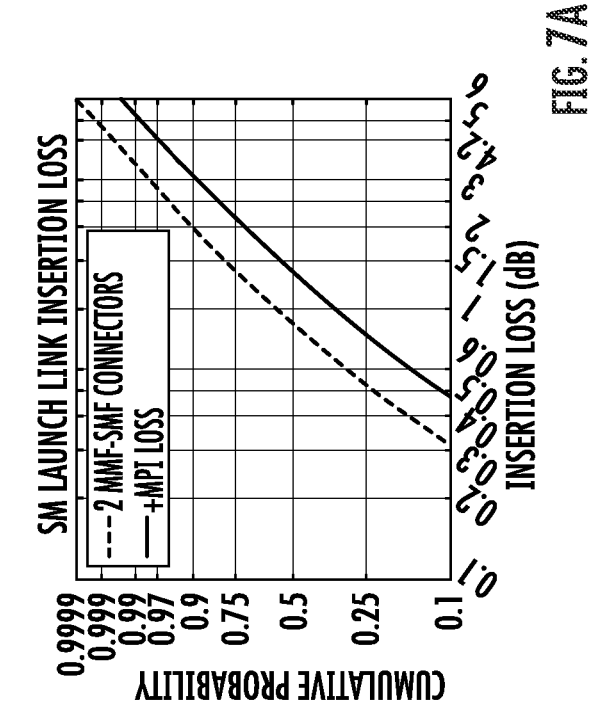
FIG. 7B is a graph of a link loss distribution of a multimode fiber having ends mechanically spliced to single-mode fiber stubs.

FIG. 7A is a graph of a link loss distribution of a single MMF cable assembly 106 having ends that interface/mate with (i.e., optically and mechanically couple to) SMF connectors 108, such that there are two MMF connectors to SMF connector interfaces. FIG. 7B is a graph of a link loss distribution of a single multimode optical fiber 114 having mechanical splices (one at each end) to SMF stubs 108'. In a link made of two MMF-to-SMF interfaces, the link loss includes the multi-path interference, which is related to the core offset between the optical fibers. The amplitude of multi-path interference is proportional to the connection insertion loss. Taking into account the multi-path interference loss, the simulated insertion loss distribution of the total link is summarized in FIGS. 7A-7B and Table 4.

TABLE 4

|  | 97% maximum link loss (dB) |
| --- | --- |
| Keep existing MMF connectors | 4.20 |
| Mechanical splice connectors | 0.52 |
| Fusion splice on connectors | 0.35 |

As mentioned above, SMF stubs 108 according to this disclosure comprise a mode field diameter within 20% of the mode field diameter of the fundamental (LP01) mode of the multimode optical fiber at an operating wavelength (e.g., 1310 nm). An SMF stub 108 may be selected to be used in a fiber optic system that comprises OM1, OM2, OM3, OM4, or OM5 multimode optical fiber. In other words, properties of an SMF stub 108 have been discovered that allow such SMF stub 108 to be used according to this disclosure for multiple types of multimode fiber, despite the fact that OM1 multimode fiber has a core diameter (62.5 µm) and core delta (2%) different than other types of multimode fiber. This was confirmed through modeling and experimental studies that were performed on the tolerance of a mode-matching SMF stub 108 according to this disclosure and center-to-center offsets using both OM1 and OM2 multimode fibers. As mentioned above, OM2 multimode fiber has a core diameter of 50 µm and a core delta of 1%. Although OM2 was used for the comparison, the results of the studies are also applicable to OM3 and OM4 multimode fiber, which all have a 50 µm core diameter.

The OM1 and OM2 multimode fibers in the modeling both have centerline defects and non-alpha errors. The OM1 multimode fiber has a mode field diameter of 13.72 µm at 1310 nm, and a overfill modal bandwidth of 710 MHz*km at 850 nm and 506 MHz*km at 1310 nm as measured from overfill launch condition, for example, through placing a modal conditioner such as Ardent Photonics ModCon conditioner in the light launch end. The OM2 multimode fiber has a mode field diameter of 14.86 µm at 1310 nm, and an overfill modal bandwidth of 1308 MHz*km at 850 nm and 570 MHz*km at 1310 nm.

Figure 8B:
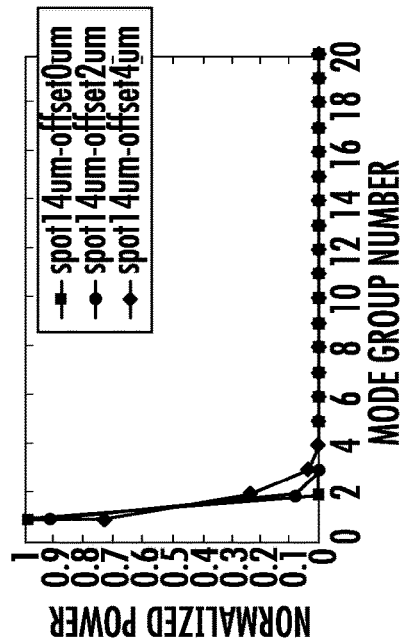
FIG. 8B is a graph similar to FIG. 8A, except that the multimode fiber comprises OM2 multimode fiber with a mode field diameter of 14.86 µm at 1310 nm.
Figure 9B:
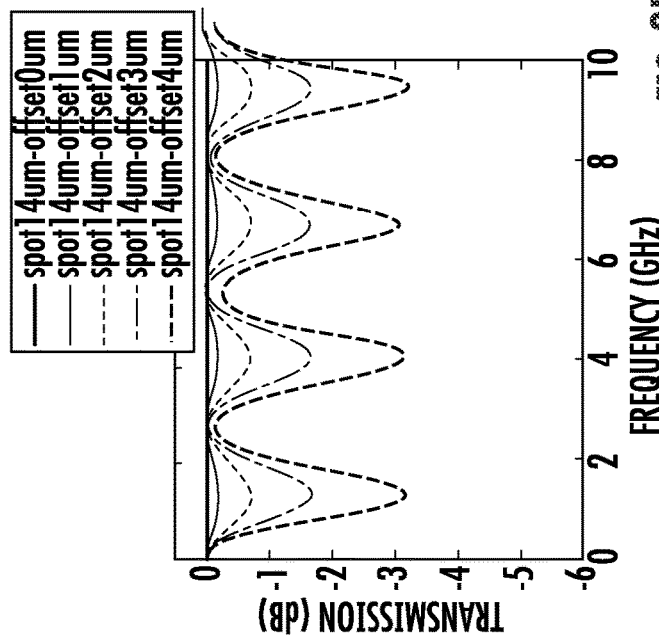
FIG. 9B is a graph similar to FIG. 9A, except that the multimode fiber comprises OM2 multimode fiber with a mode field diameter of 14.86 µm at 1310 nm.
Figure 8A:
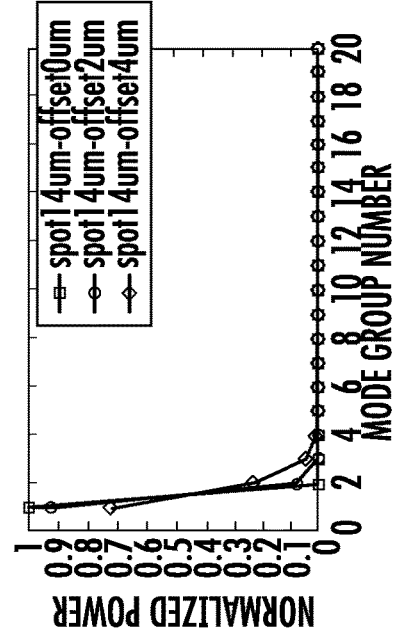
FIG. 8A is a graph of modeled excited power in each mode group of a multimode fiber using a 14 µm diameter single-mode Gaussian launch spot with different offsets to a center of the multimode fiber, wherein the multimode fiber comprises OM1 multimode fiber with a mode field diameter of 13.72 µm at 1310 nm.
Figure 9A:
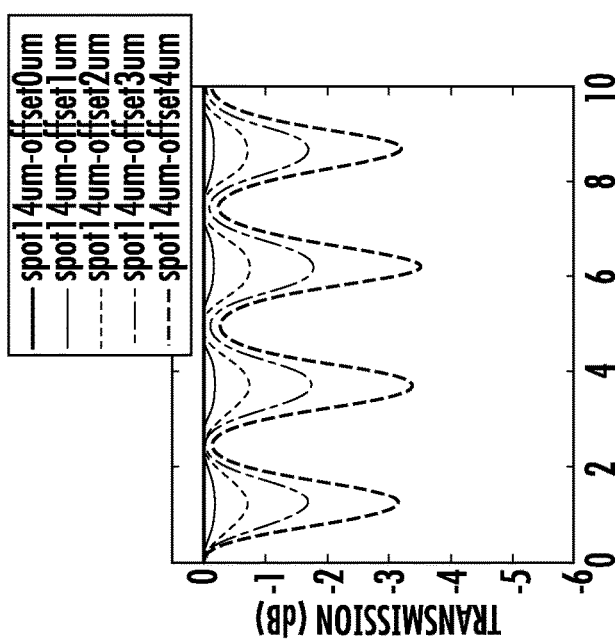
FIG. 9A is a graph of modeled transfer function (frequency response) of a multimode fiber using a 14 µm diameter single-mode Gaussian launch spot with different offsets to a center of the multimode fiber, wherein the multimode fiber comprises OM1 multimode fiber with a mode field diameter of 13.72 µm at 1310 nm.

FIGS. 8A and 8B are graphs of modeled excited power in each mode group of the OM1 and OM2 multimode fibers, respectively, using a 14 µm diameter single-mode Gaussian launch spot with different offsets to a center of the OM1 and OM2 multimode fibers. If the mode field diameter of the SMF stub 108 does not match that of the OM1 or OM2 multimode fiber at 1310 nm, high order modes can be launched into the multimode fiber due to the mismatch. Similarly, if there is an offset between the centers of the SMF stub 108 and the multimode fiber, high order modes can be excited as well. As shown in FIGS. 8A and 8B, since the mode field diameters of the OM1 and OM2 multimode fibers are both close to 14 µm, when the center of the SMF stub 108 is perfectly aligned to the multimode fiber (0 um offset), only the fundamental (LP01) mode is excited in the multimode fiber. This leads to a flat frequency response of the links, as shown in FIGS. 9A and 9B, which are graphs of modeled transfer function (frequency response) of the OM1 and OM2 multimode fiber, respectively, using a 14 µm diameter single-mode Gaussian launch spot with different offsets to a center of the multimode fiber. Such a flat transfer function means the associated link has extremely high modal bandwidth and, as a result, the link can support high data rates over long distances (i.e., long system reach). Conversely, the more the center of the SMF stub 108 is offset from the center of the multimode fiber, the more higher order modes are excited in the multimode fiber. As an example, for the situation where there is an offset around 2 µm, around 7.5% of the light is launched into the second order mode in the multimode fiber. For the situation where there is an offset around 4 µm, this percentage increases to around 23%. As a result of such high order mode excitation in the multimode fiber, oscillations show up in the transfer functions of the fiber, as shown in FIGS. 9A and 9B in the corresponding curves. The length of the OM1 and OM2 multimode fibers were assumed to be 1 km in the modeling. The modal bandwidth of a fiber is defined such that the transmission drops by 3 dB from the 0 frequency. As can be seen from FIGS. 9A and 9B, the more that high order modes are excited in the OM1 and OM2 multimode fiber, the deeper the dip is in the transfer function, which leads to bandwidth decrease. In such case, a second SMF stub 108 can be used at the receiving end of the link to filter the high order modes and increase the bandwidth, as will be discussed more using the experimental results.

Figure 10A:
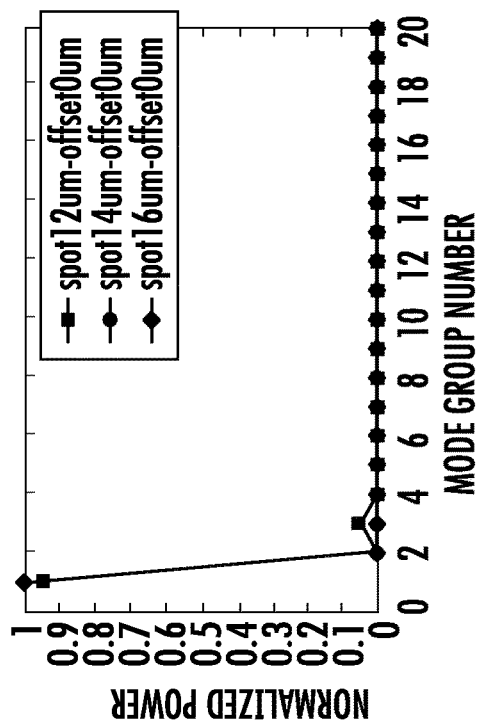
FIG. 10A is a graph of modeled excited power in each mode group of a multimode fiber using a single-mode Gaussian launch spot with different spot sizes and no offset to a center of the multimode fiber, wherein the multimode fiber comprises OM1 multimode fiber with a mode field diameter of 13.72 µm at 1310 nm.
Figure 10B:
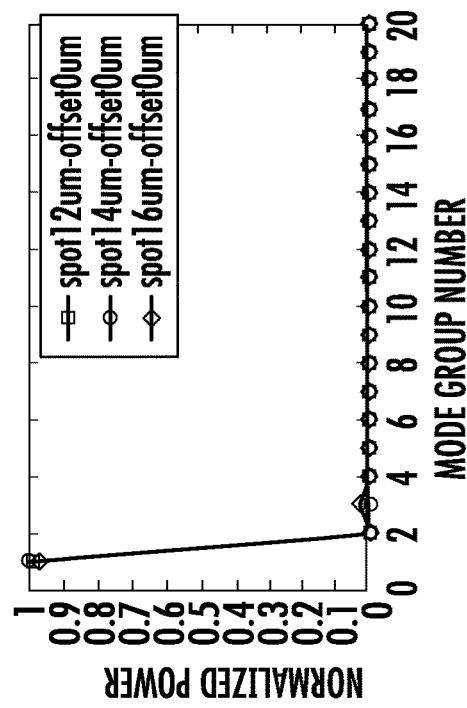
FIG. 10B is a graph similar to FIG. 10A, except that the multimode fiber comprises multimode fiber with a mode field diameter of 14.86 µm at 1310 nm.
Figure 11A:
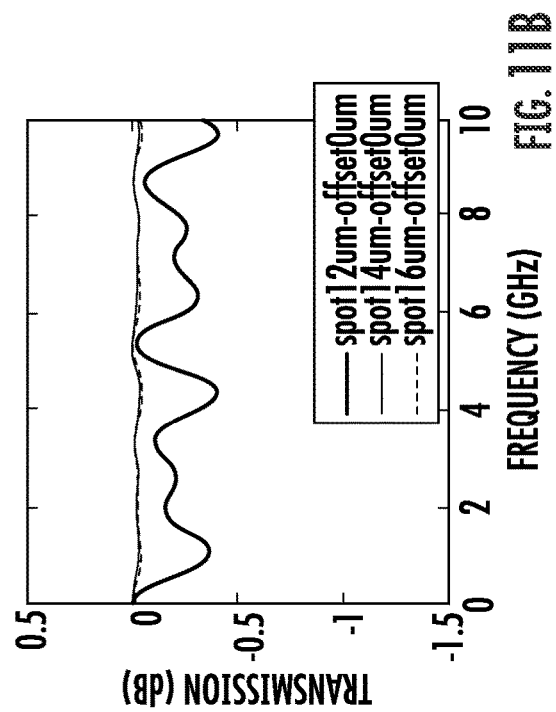
FIG. 11A is a graph of modeled transfer function (frequency response) of a multimode fiber using a single-mode Gaussian launch spot with different spot sizes and no offset to a center of the multimode fiber, wherein the multimode fiber comprises OM1 multimode fiber with a mode field diameter of 13.72 µm at 1310 nm.
Figure 11B:
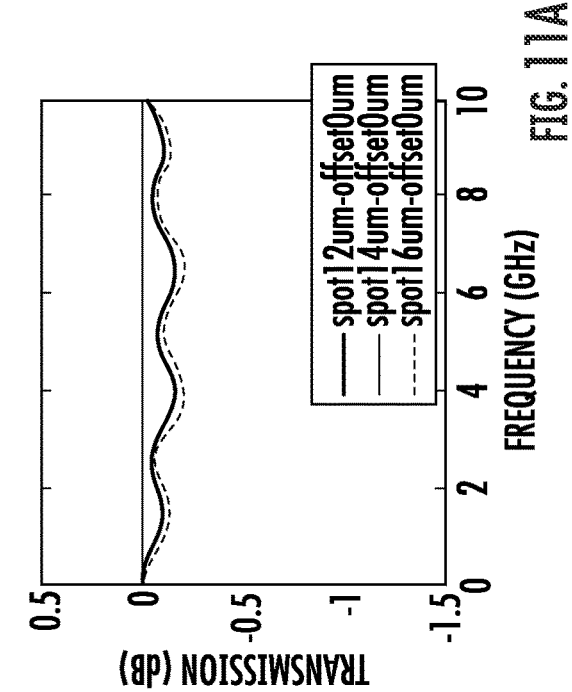
FIG. 11B is a graph similar to FIG. 11A, except that the multimode fiber comprises multimode fiber with a mode field diameter of 14.86 µm at 1310 nm.

FIGS. 10A and 10B are graphs of modeled excited power in each mode group of the OM1 and OM2 multimode fibers, respectively, using a single-mode Gaussian launch with different spot sizes (diameters) and no offset to a center of the OM1 and OM2 multimode fibers (i.e., the SMF stub 108 is perfectly aligned to the multimode fiber). As shown, for both the OM1 and OM2 multimode fibers, the fundamental mode is predominantly excited with a launch spot size ranging from 12 µm to 16 µm, and the power excited into high order modes is less than 5%. As a result, the transfer functions shown in FIGS. 11A and 11B are very flat, indicating high modal bandwidth. Such results indicate that there is 2 µm spot size or mode field diameter tolerance for the SMF stub 108.

Experiments were conducted in light of the modeling to confirm the functionality of using SMF stubs 108 for fundamental mode transmission in multimode fibers. The SMF stubs 108 used in the experiments had a mode field diameter of 14.02 µm and were included in LC-type fiber optic connectors (e.g., SMF connectors 110). As mentioned above, however, this disclosure may apply to other connector types such as SC (e.g., according to IEC 61754-4:2013) and ST (e.g., according to TIA/EIA 604-2:2004). Both mechanical splice and fusion splice-on forms of these connector types and others are possible.

Figure 12A:
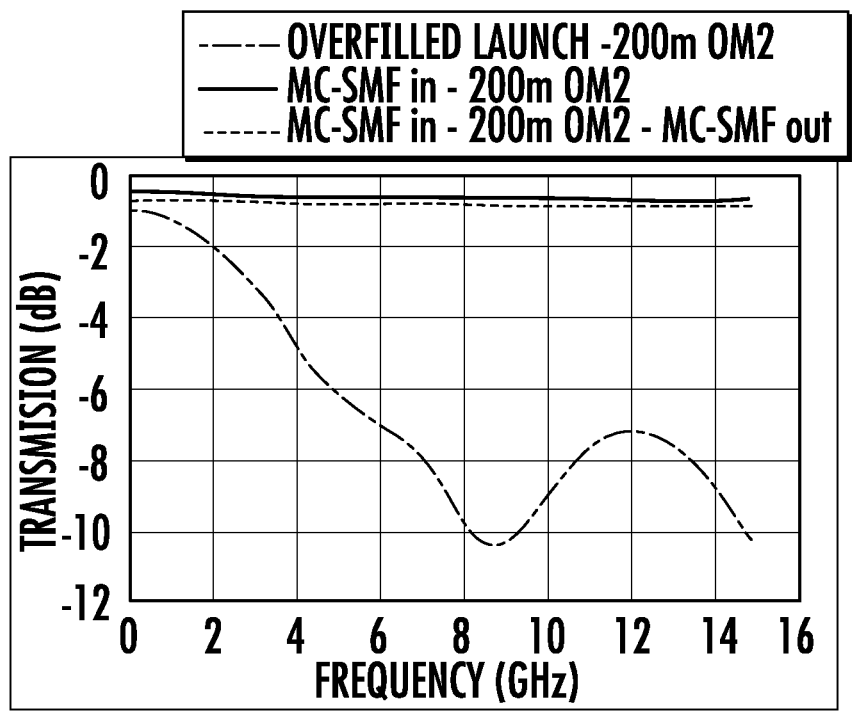
FIG. 12A is a graph of measured transfer functions (frequency response) of a 200 m length of OM1 multimode under three different launch conditions.
Figure 12B:
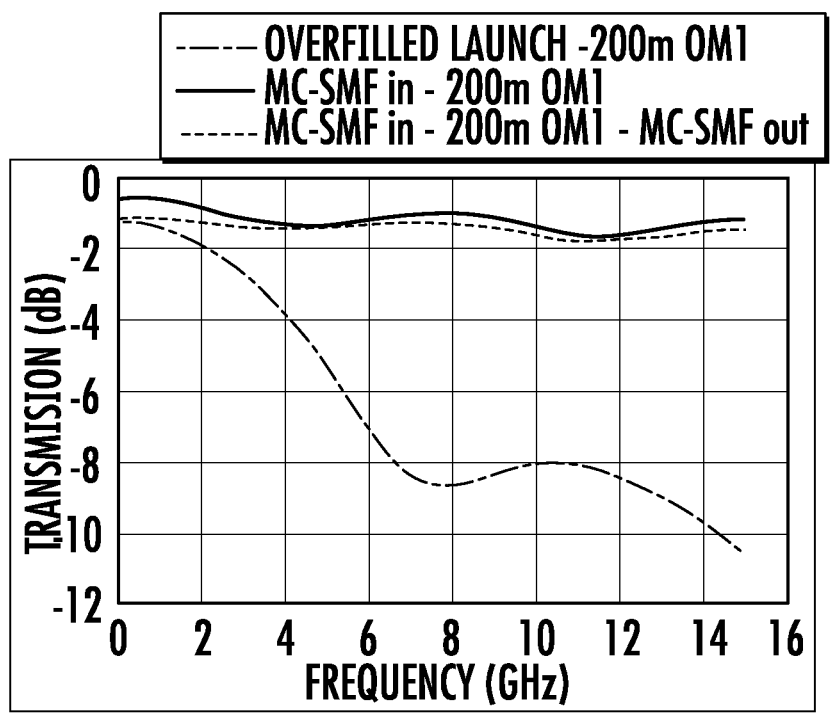
FIG. 12B is a graph of measured transfer functions (frequency response) of a 200 m length of OM2 multimode under three different launch conditions.

FIGS. 12A and 12B are graphs of measured transfer functions (frequency response) of a 200 m length of OM1 multimode and a 200 m length of OM2 multimode fiber, respectively, under three different launch conditions. One condition is an overfilled launch, another is the associated link including a SMF stub 108 only at the launch end, and the third is the associated link include SMF stubs 108 at both the launch and receiving ends. As shown in FIGS. 12A and 12B, in the overfilled launch condition, the transfer function drops significantly. The 200 m length of OM1 multimode fiber has an overfill modal bandwidth of 4.25 GHz, which corresponds to a scaled bandwidth of 850 MHz*km, and the 200 m length of OM1 multimode fiber has an overfill modal bandwidth of 6.02 GHz, which corresponds to a scaled bandwidth of 1204 MHz*km. Conversely, when using a SMF stub 108 in the launch end (solid line), the transfer function is much flatter, which is because the fundamental mode is predominantly launched into the multimode fiber, resulting in higher bandwidth. A second SMF stub 108 can be used at the receiving end to filter the high order modes and further increase the bandwidth. As shown for this condition in FIGS. 12A and 12B, the flatness of the transfer function is increased when including a second SMF stub 108 in the receiving end of the link (dashed line). This, in turn, increases the modal bandwidth, which can be critical in high data rate transmission systems.

As part of the experiments, bit-error-rates (BERs) were also measured. The measured BERs for both the link having the 200 m length of OM1 multimode fiber and the link having the 200 m length of OM2 multimode fiber, under the condition involving SMF stubs 108 at each end of the associated link, were below 1E-10.

Figure 13C:
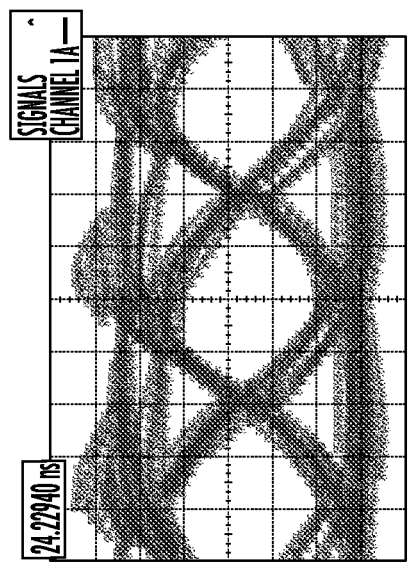
FIGS. 13A, 13B, and 13C are measured optical eye diagrams of a multimode link between 25G LR transceivers/receivers, wherein the diagrams respectively correspond to fiber optic systems comprising: a 1 m length of OM1 multimode fiber between a transmitter port of the transceiver and a receiver port of the receiver (FIG. 13A); a length of 200 m OM1 multimode fiber having both ends spliced to respective single-mode fiber stubs according to this disclosure (FIG. 13B); and a length of 200 m of OM2 multimode fiber having both ends spliced to respective single-mode fiber stubs according to this disclosure (FIG. 13C)
Figure 13B:
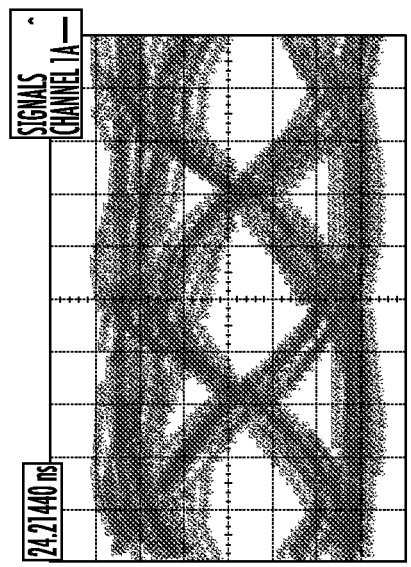
Figure 13A:
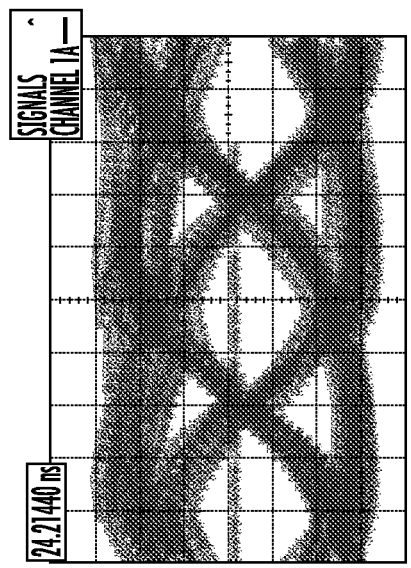

FIGS. 13A, 13B, and 13C are measured optical eye diagrams (e.g., from an oscilloscope) of a multimode link between 25G LR transceivers/receivers. The diagrams respectively correspond to fiber optic systems comprising: a 1 m length of OM1 multimode fiber between a transmitter port of the transceiver and a receiver port of the receiver (FIG. 13A); a length of 200 m OM1 multimode fiber having both ends optically coupled to respective single-mode fiber stubs according to this disclosure (FIG. 13B); and a length of 200 m of OM2 multimode fiber having both ends spliced to respective single-mode fiber stubs according to this disclosure (FIG. 13C). As can be seen, the optic eye diagrams are open and clear for the different conditions.

Figure 14:
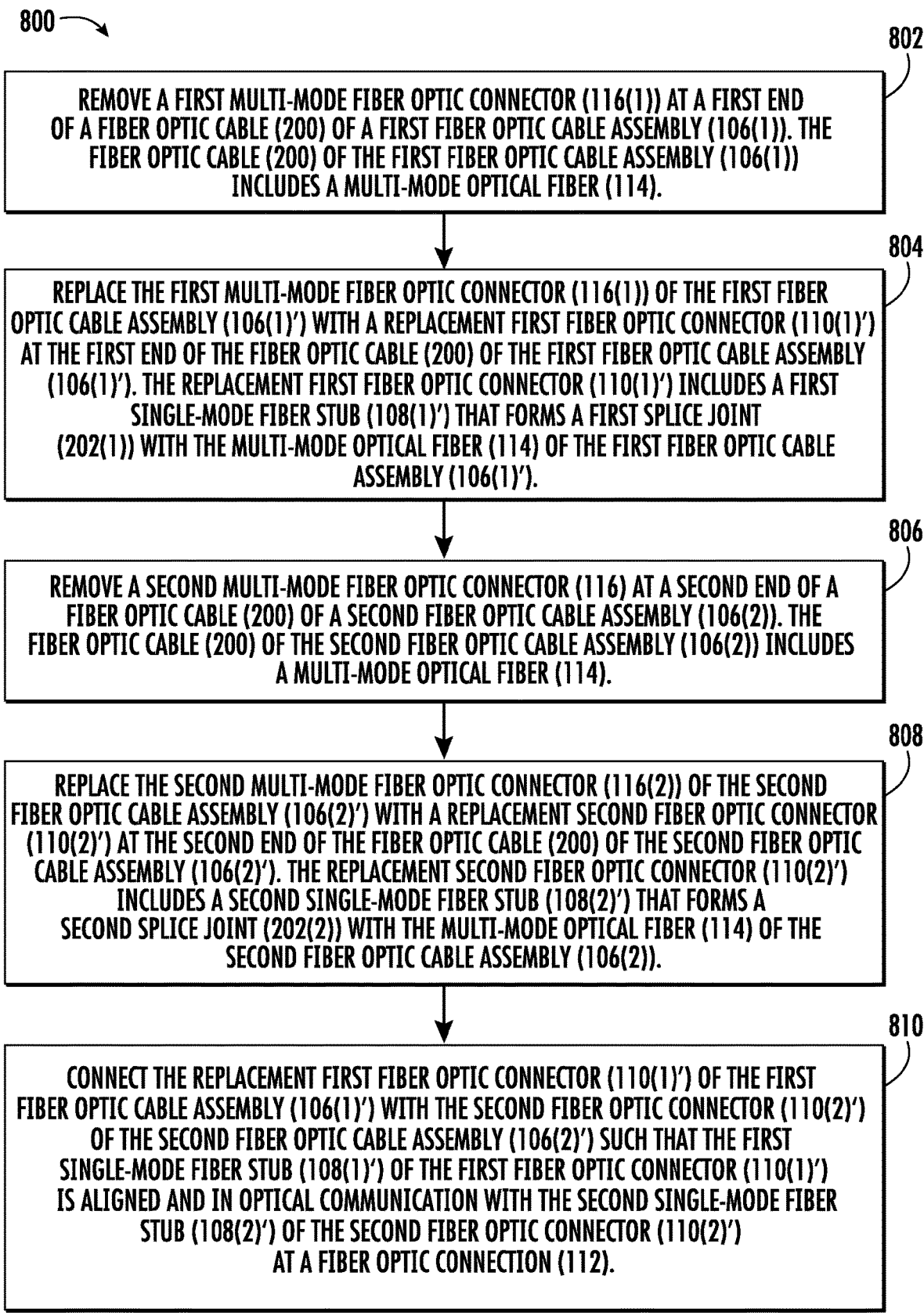
FIG. 14 is a flowchart of steps for using the fiber optic system of FIGS. 2-7B.

FIG. 14 is a flowchart of steps 800 for using the fiber optic system of FIGS. 2-7B. Step 802 includes removing a first multimode fiber optic connector 116(1) at a first end of a fiber optic cable 200 of a first fiber optic cable assembly 106(1). The fiber optic cable 200 of the first fiber optic cable assembly 106(1) includes a multimode optical fiber 114. The multimode optical fiber 114 includes a mode field diameter of a fundamental mode at an operating wavelength.

Step 804 includes replacing the first multimode fiber optic connector 116(1) of the first fiber optic cable assembly 106(1)' with a replacement first fiber optic connector 110(1)' at the first end of the fiber optic cable 200 of the first fiber optic cable assembly 106(1)'. The replacement first fiber optic connector 110(1)' includes a first single-mode fiber stub 108(1)' that forms a first splice joint 202(1) with the multimode optical fiber 114 of the first fiber optic cable assembly 106(1)'. The first single-mode fiber stub 108(1)' of the first fiber optic cable assembly 106(1)' includes a mode field diameter within 20% of the mode field diameter of the fundamental mode of the multimode optical fiber 114 of the first fiber optic cable assembly 106' at the operating wavelength. The first single-mode fiber stub 108(1)' of the first fiber optic cable assembly 106(1)' includes a fiber cutoff wavelength below the operating wavelength.

Step 806 includes removing a second multimode fiber optic connector 116 at a second end of a fiber optic cable 200 of a second fiber optic cable assembly 106(2). The fiber optic cable 200 of the second fiber optic cable assembly 106(2) includes a multimode optical fiber 114. The multimode optical fiber 114 includes a mode field diameter of a fundamental mode at the operating wavelength.

Step 808 includes replacing the second multimode fiber optic connector 116(2) of the second fiber optic cable assembly 106(2)' with a replacement second fiber optic connector 110(2)' at the second end of the fiber optic cable 200 of the second fiber optic cable assembly 106(2)'. The replacement second fiber optic connector 110(2)' includes a second single-mode fiber stub 108(2)' that forms a second splice joint 202(2) with the multimode optical fiber 114 of the second fiber optic cable assembly 106(2). The second single-mode fiber stub 108(2)' of the second fiber optic cable assembly 106(2)' includes a mode field diameter within 20% of the mode field diameter of the fundamental mode of the multimode optical fiber 114 of the second fiber optic cable assembly 106(2)' at the operating wavelength. The second single-mode fiber stub 108(2)' of the second fiber optic cable assembly 106(2)' includes a fiber cutoff wavelength below the operating wavelength.

Step 810 includes connecting the replacement first fiber optic connector 110(1)' of the first fiber optic cable assembly 106(1)' with the second fiber optic connector 110(2)' of the second fiber optic cable assembly 106(2)' such that the first single-mode fiber stub 108(1)' of the first fiber optic connector 110(1)' of the first fiber optic cable assembly 106(1)' is aligned and in optical communication with the second single-mode fiber stub 108(2)' of the second fiber optic connector 110(2)' of the second fiber optic cable assembly 106(2)' at a fiber optic connection 112.

In certain embodiments, the first single-mode fiber stub 108(1)' of the first fiber optic connector 110(1)' of the first fiber optic cable assembly 106(1)' is aligned and in direct optical communication with the second single-mode fiber stub 108(2)' of the second fiber optic connector 110(2)' of the second fiber optic cable assembly 106(2)'.

In certain embodiments, the method further includes replacing a second multimode fiber optic connector 110(2)' at a second end of the fiber optic cable 200 of the first fiber optic cable assembly 106(1)' with a replacement second fiber optic connector 110(2)'. The replacement second fiber optic connector 110(2)' of the first fiber optic cable assembly 106(1)' includes a second single-mode fiber stub 108(2)' that forms a second splice joint 202(2) with the multimode optical fiber 114 of the first fiber optic cable assembly 106(1)'. The second single-mode fiber stub 108(2)' of the first fiber optic cable assembly 106(1)' includes a mode field diameter within 20% deviation of the mode field diameter of the fundamental mode of the multimode optical fiber 114 of the first fiber optic cable assembly 106(1)' at the operating wavelength. The second single-mode fiber stub 108(2)' of the first fiber optic cable assembly 106(1)' includes a fiber cutoff wavelength below the operating wavelength propagated by the multimode optical fiber 114 of the first fiber optic cable assembly 106(1)'.

In certain embodiments, the method further includes replacing a first multimode fiber optic connector 116(1) at a first end of the fiber optic cable 200 of the second fiber optic cable assembly 106(2)' with a replacement first fiber optic connector 110(1)'. The replacement first fiber optic connector 110(1)' of the second fiber optic cable assembly 106(2)' includes a single-mode fiber stub 108(1)' that forms a first splice joint 202(1) with the multimode optical fiber 114 of the second fiber optic cable assembly 106(2)'. The first single-mode fiber stub 108(1)' of the second fiber optic cable assembly 106(2)' includes a mode field diameter within 20% deviation of the mode field diameter of the fundamental mode of the multimode optical fiber 114 of the second fiber optic cable assembly 106(2)' at the operating wavelength. The first single-mode fiber stub 108(1)' of the second fiber optic cable assembly 106(2)' includes a fiber cutoff wavelength below the operating wavelength propagated by the multimode optical fiber 114 of the second fiber optic cable assembly 106(2)'.

In certain embodiments, the method further includes replacing each multimode fiber optic connector 116 along an optical path between a transmitter 102A and a receiver 102B with a replacement fiber optic connector 110'. Each replacement fiber optic connector 110' includes a single-mode optical fiber 108. The optical path includes a plurality of multimode optical fibers 114 between each of the replacement fiber optic connectors 110'.

Figure 15:
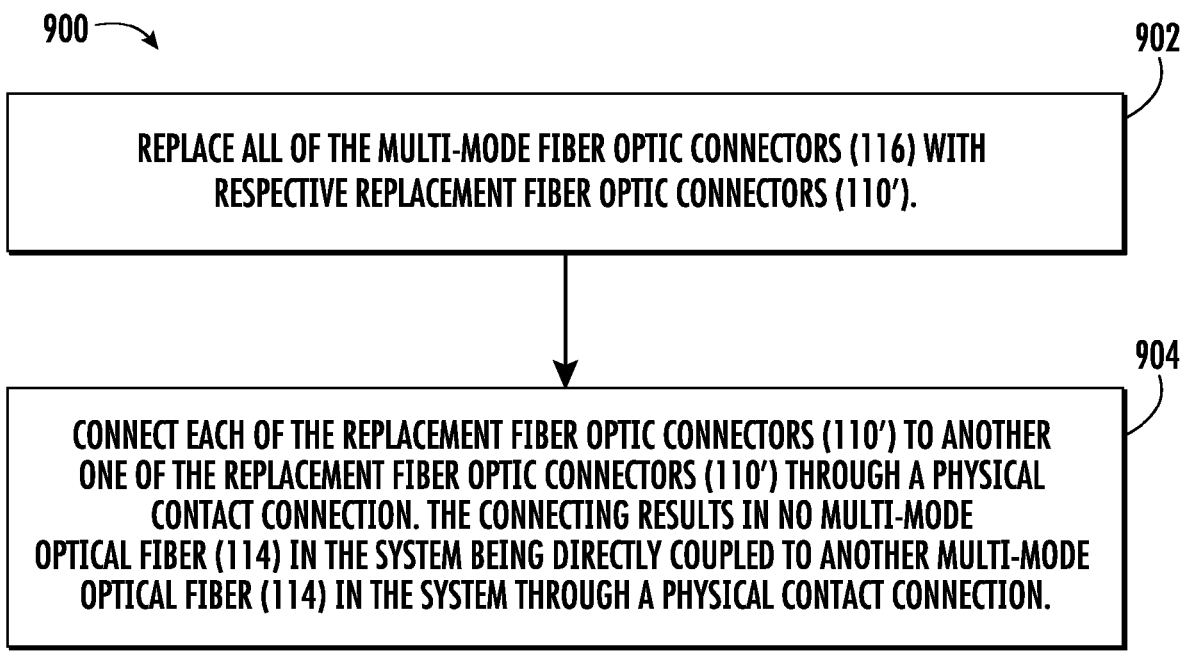
FIG. 15 is a flowchart of steps for using the fiber optic system of FIGS. 2-7B.

FIG. 15 is a flowchart of steps 900 for upgrading a system 100 having links of multimode optical fibers 114 connected in series. Each of the links includes opposed ends terminated with a respective multimode fiber optic connector 116 that presents the multimode optical fiber 114 of the link for optical coupling.

Step 902 includes replacing all of the multimode fiber optic connectors 116 with respective replacement fiber optic connectors 110'. The replacing does not involve removing all of the multimode optical fibers 114 such that following the replacing, at least several of the links include the multimode optical fiber 114 of the respective link being terminated with the respective replacement connectors 110'.

Step 904 includes connecting each of the replacement fiber optic connectors 110' to another one of the replacement fiber optic connectors 110' through a physical contact connection. The connecting results in no multimode optical fiber 114 in the system being directly coupled to another multimode optical fiber 114 in the system through a physical contact connection.

In certain embodiments, prior to the replacing, at least two of the links are in the form of a fiber optic cable assembly 106 that includes a fiber optic cable 200 terminated by the respective multimode fiber optic connectors 116. Further, the respective replacement connectors 110' for several of the at least two links each comprise a single-mode fiber stub 108' that forms a splice joint 202 with the multimode optical fiber 114 of the fiber optic cable assembly 106. The single-mode fiber stub 108' includes a mode field diameter within 20% of a mode field diameter of a fundamental mode of the multimode optical fiber 114 of the fiber optic cable assembly 106 at an operating wavelength. The single-mode fiber stub 108' includes a fiber cutoff wavelength below the operating wavelength propagated by the multimode optical fiber 114 of the first fiber optic cable assembly 106.

In certain embodiments, the at least two links that are in the form of a fiber optic cable assembly 106 includes a) a first fiber optic cable assembly 106(1) having the respective multimode fiber optic connectors 116 as a first multimode fiber optic connector 116(1) and a second multimode fiber optic connector 116(2), and b) a second fiber optic cable assembly 106(2) having the respective multimode fiber optic connectors as a first multimode fiber optic connector 116(1) and a second multimode fiber optic connector 116(2). Further, the replacing includes removing the first multimode fiber optic connector 116(1) of the first fiber optic cable assembly 106(1). The replacing further includes replacing the first multimode fiber optic connector 116(1) of the first fiber optic cable assembly 106(1) with the respective replacement fiber optic connector 110' as a replacement first fiber optic connector 110(1)'. The replacing further includes replacing the first multimode fiber optic connector 116(1) of the second fiber optic cable assembly 106(2) with the respective replacement fiber optic connector 110', a replacement second fiber optic connector 110(2)'. Further, the connecting includes connecting the replacement first fiber optic connector 110(1)' of the first fiber optic cable assembly 106(1) with the second fiber optic connector 110(2)' of the second fiber optic cable assembly 106(2) through a physical contact connection such that the single-mode fiber stub 108' of the replacement first fiber optic connector 110(1)' is aligned and in optical communication with the single-mode fiber stub 108' of the replacement second fiber optic connector 110(2)'.

In certain embodiments, prior to the replacing, at least three of the links are in the form of a fiber optic cable assembly 106 that includes a fiber optic cable 200 terminated by the respective multimode fiber optic connectors 116. Further, the replacing includes replacing at least one cable assembly 106 of the at least three links with a single-mode cable assembly 106' that includes single-mode optical fiber 108' having opposed ends terminated by the respective replacement connectors 110'.

In certain embodiments, prior to the replacing, at least one of the links is in the form of multimode fiber optic equipment that includes the multimode optical fiber 114 of the link and the respective multimode fiber optic connectors 116 in an interior of the multimode fiber optic equipment. Further, the replacing includes replacing the fiber optic equipment with single-mode fiber optic equipment that includes single-mode optical fiber 108' having opposed ends terminated with the respective replacement connectors 110'.

In certain embodiments, each of the multimode optical fibers 114 is associated with a specification that allows a fiber core eccentricity of the multimode optical fiber to be >0.5 µm and an outer diameter of the multimode optical fiber 114 to be outside of a range of 125±0.7 µm. Each of the multimode fiber optic connectors 116 includes a ferrule 301 having a ferrule bore (referred to as "ferrule hole" above), the ferrule 301 being associated with a specification that allows a ferrule bore eccentricity of the ferrule bore to be >1.0 µm, and a diameter of the ferrule bore to be outside the range of 126±0.5 µm. Each of the replacement fiber optic connectors 110' includes a replacement ferrule 301 having a ferrule bore, the replacement ferrule being associated with a specification that allows a ferrule bore eccentricity of the ferrule bore to be <1.0 µm and a diameter of the ferrule bore to be within the range of 126±0.5 µm.

In certain embodiments, the ferrule 301 for each of the replacement fiber optic connectors 110' terminates a respective single-mode optical fiber that is associated with a specification where fiber core eccentricity is <0.5 µm and an outer diameter of the single-mode optical fiber 108' is within the range of 125±0.7 µm.

Note that the principles disclosed above focus on single-mode optical fiber stubs (e.g., SMF stubs 108') being included in ferrules that are assembled into fiber optic connectors (e.g., SMF connectors 110'). For many aspects of this disclosure, the principles also apply to other form factors of mode conditioning/filtering devices. In other words, the SMF connectors 108' disclosed above are one example form factor of devices for mode conditioning and/or filtering according to this disclosure. Other form factors for such devices are possible that apply principles of this disclosure.

Figure 16:
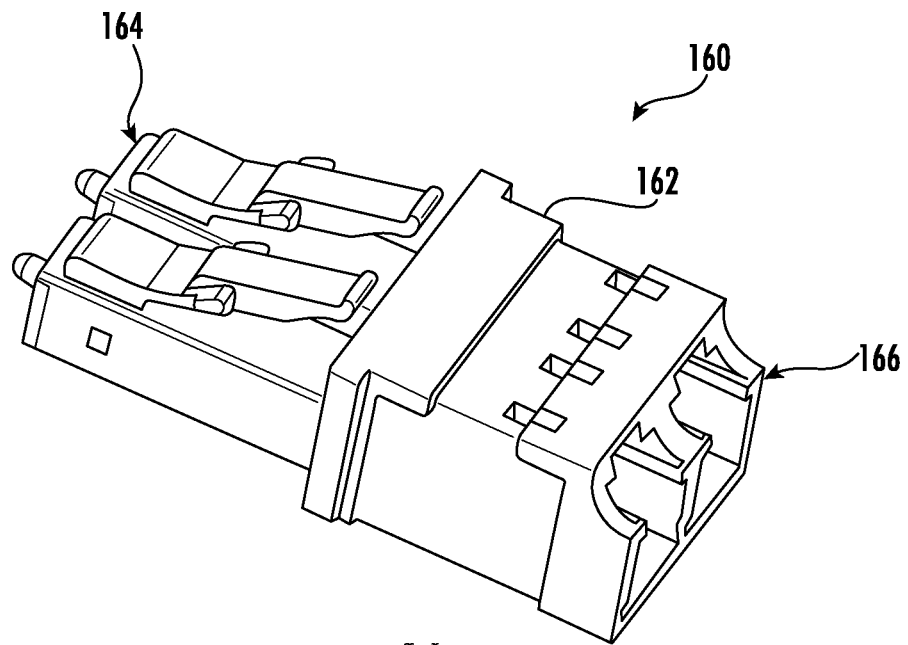
FIG. 16 is a perspective view of an example of an adapter that may be used in fiber optic systems according to this disclosure.
Figure 17:
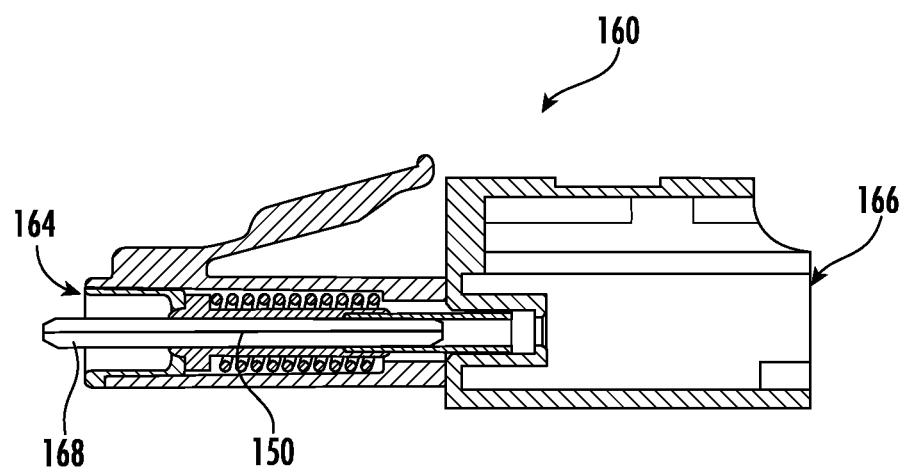
FIG. 17 is cross-sectional view of the adapter of FIG. 16.

To this end, FIGS. 16 and 17 illustrate an adapter 160 that is another example of a device that may be used for mode conditioning and/or mode filtering according to this disclosure. The adapter 160 includes a body 162, ferrules 168 supported within the body 162 (only one ferrule 168 can be seen in FIG. 17), and respective SMF stubs 150 secured within the ferrules 168. On a first side of the adapter, the body 162 and the ferrules 168 define a male connection interface 164 (e.g., a duplex connector interface). On a second side of the adapter, the body 162 and the ferrules 168 define a female connection interface 166 (e.g., a duplex receptacle interface). Although the embodiment shown includes two ferrules 168 and has a duplex (two-channel/two-port) configuration, other embodiments are possible having a single ferrule (e.g., for simplex fiber connections) or more than two ferrules (e.g., for multiple duplex fiber connections).

The ferrules 168 each include a first end (front end) associated with the male connection interface 164 and a second end (back end) associated with the female connection interface 166. The SMF stubs 150 each extend between the first and second ends of the associated ferrule 168, and each terminate at the first and second ends of the associated ferrule 168. Thus, the SMF stubs 150 in this embodiment each have a length that is approximately equal to distance between the front end and the back end of the associated ferrule 168. In certain embodiments, the SMF stubs 150 have a length of less than 2 cm, such as between 0.5 and 1.5 cm.

When the adapter 160 is used instead of SMF connectors 110', there may not be a need to remove MMF connectors 116 from the fiber optic system. Instead, MMF connectors 116 on the end of a link (a MMF cable assembly 106) may be coupled to the female connection interface 166 of the adapter 160. Doing so results in ferrules of the MMF connectors 116 being placed into physical contact with the ferrules 168, with ends of the multimode optical fibers 114 being aligned with the second ends of the SMF stubs 150 so that they are optically coupled. The modeling described above with respect to FIG. 8B-12B applies equally to the adapter 160 being used to establish an optical connection between an SMF stub and a multimode optical fiber.

Figure 18A:
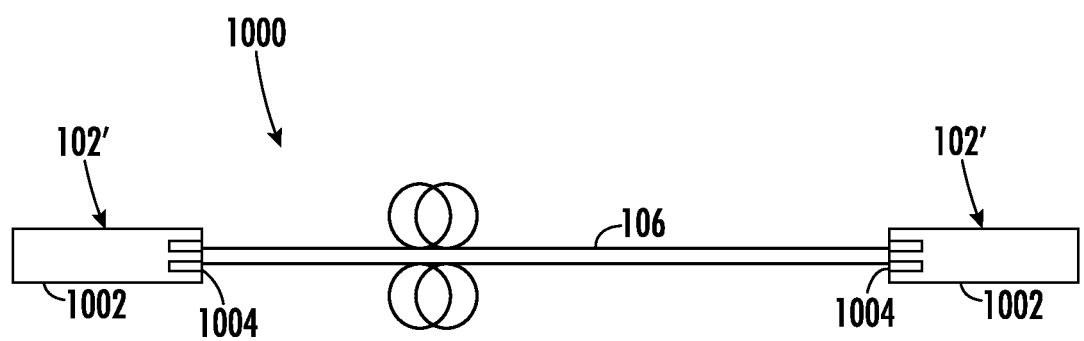
FIG. 18A is a diagram of a fiber optic system including single-mode transceivers and a representative multimode optical fiber, wherein the single-mode transceivers each include ferrules and terminating mode-matching single-mode fiber stubs.
Figure 18B:
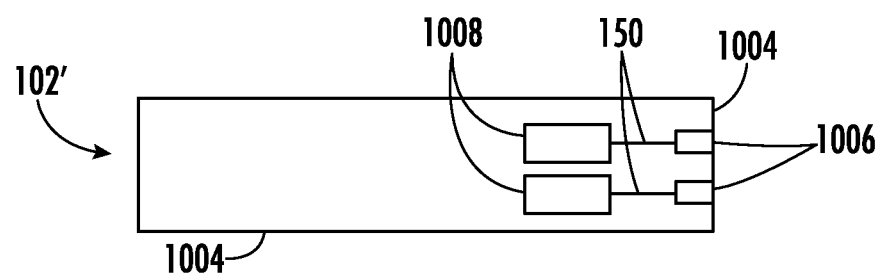
FIG. 18B is close-up diagram of one of the single-mode transceivers of FIG. 18A illustrating how the mode-matching single-mode fiber stubs are optically coupled to an optical-electrical sub-assembly (e.g., transceiver optical sub-assembly or receiver optical sub-assembly).

As another example, in some embodiments, SMF stubs 150 may be incorporated directly in optical transceivers. Such embodiments enable fundamental mode transmission over existing MMF cabling infrastructure. For example, FIG. 18A is a schematic diagram of a system 1000 that includes two transceivers 102' connected by one or more MMF cable assemblies 106. Each transceiver 102' includes a housing 1002 and an optical interface 1004. The optical interface 1004 is configured to receive one or more optical connectors (not shown; e.g., MMF connectors 116; see FIG. 1), which include ferrules for aligning with and contacting ferrules 1006 of the optical interface. As schematically shown in FIG. 18B, ferrules 1006 terminate SMF stubs 150 that extend into the housing 1002 and couple to an optical-electronic sub-assembly 1008, such as a transmitter optical sub-assembly (TOSA), receiver optical sub-assembly (ROSA), or bi-directional optical sub-assembly (BOSA).

Integrating SMF stubs 150 into the transceivers 102' may provide several benefits. First, since the SMF stubs 150 enable transmission of a fundamental mode over the MMF cabling 106, there may not be a need to integrate components like SMF connectors 110' or adapters 160 with SMF stubs 150 into the system 1000. This avoids increasing the overall number of optical connections/junctions in the system 1000, which in turn can help avoid increased losses (e.g., insertion loss and/or multi-path interference) that are associated with optical connections/junctions. This is also convenient from an installation standpoint, since only the transceivers 102' need to be installed to upgrade a system that was originally designed and installed for multimode transmission. Despite these advantages, if desired, components such as MF connectors 110' or adapters 160 with SMF stubs 150 may still be used in combination with the transceivers 102'. Second, the transceivers 102' may include additional signal processing capabilities to optimize performance of the system 1000 for transmission of the fundamental mode.

Note that the optical interface 1004 may have any suitable design for transceiver applications. In the embodiment shown, the optical interface 1004 is configured to accept two-fiber connectors, such as LC duplex connectors (e.g., according to IEC 61754-20:2012) or MDC, SN, or CS connectors (e.g., according to the QSFP-DD Multi-Source Agreement (MSA) Hardware Specification, Rev. 6.0, 2021, and the relevant documents cross-referenced therein). Examples of optical transceivers with duplex LC connectors include 25G LR, 100G CWDM4, 100G LR4, 100G ER4, 400G FR4, and 400G LR. In alternative embodiments, the optical interface 1004 may be configured for different connector types, such multi-fiber push-on/pull-off (MPO) connectors (e.g., according to IEC 61754-7) or other multi-fiber connectors. Examples of optical transceivers with MPO connectors include 40G PSM4, 100G PSM4, and 400G DR4. As can be appreciated, SMF stubs 150 may be terminated by different types of ferrules, depending on the connector-type for which the optical interface 1004 is designed. Many other embodiments, modifications, and/or variations of the concepts in this disclosure will come to mind to one skilled in optical communications. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical transceiver for use in a fiber optic system that includes at least one fiber optic cable assembly having a multimode optical fiber, comprising:
    a housing;
    at least one optical-electronic sub-assembly within the housing configured for single-mode transmission at an operating wavelength;
    an optical interface including at least one ferrule;
    at least one single-mode fiber stub terminated by the at least one ferrule, wherein each single-mode fiber stub of the at least one single-mode fiber stub:
        is optically coupled to an optical-electronic sub-assembly of the at least one optical-electronic assembly,
        has a mode field diameter within 20% of a mode field diameter of a fundamental mode of OM1, OM2, OM3, OM4, and OM5 multimode optical fiber at the operating wavelength, and
        has a fiber cutoff wavelength below the operating wavelength.

2. The optical transceiver according to claim 1, further comprising:
    a female connection interface that includes a front end of the at least one ferrule, wherein each single-mode fiber stub of the at least one single-mode fiber stub extends from a back end of the ferrule that terminates the single-mode fiber stub.

3. The optical transceiver according to claim 2, wherein the female connection interface is configured to accept a duplex connector.

4. The optical transceiver according to claim 3, wherein the female connection interface is configured to accept an LC duplex connector according to IEC 61754-20:2012.

5. The optical transceiver according to claim 2, wherein the female connection interface is configured to accept a multi-fiber connector.

6. The optical transceiver according to claim 5, wherein the optical interface is configured to accept a MPO connector according to IEC 61754-7-3:2019.

7. The optical transceiver according to claim 1, wherein each single-mode fiber stub of the at least one single-mode fiber stub has a length between 0.5 cm and 2.0 cm.

8. The optical transceiver according to claim 7, wherein each single-mode fiber stub of the at least one single-mode fiber stub has a fiber cutoff wavelength below 1100 nm.

9. The optical transceiver according to claim 1, wherein each single-mode fiber stub of the at least one single-mode fiber stub has a first end at a front end of the ferrule that terminates the single-mode fiber stub and a second end opposite the first end, and wherein the mode field diameter of each single-mode fiber stub of the at least one single-mode fiber stub is larger at the first end than the second end such that the single-mode fiber stub comprises a mode field transformation.

10. The optical transceiver according to claim 9, wherein each single-mode fiber stub of the at least one single-mode fiber stub has a length between 0.5 cm and 2.0 cm.

11. The optical transceiver according to claim 10, wherein each single-mode fiber stub of the at least one single-mode fiber stub has a fiber cutoff wavelength below 1100 nm.

12. A fiber optic system for transmission of an optical data signal at an operating wavelength, the fiber optic system comprising:
- at least one fiber optic cable assembly that includes at least one multimode optical fiber having a mode field diameter of a fundamental mode at the operating wavelength; and
- an optical transceiver comprising:
  - a housing;
  - at least one optical-electronic sub-assembly within the housing configured for single-mode transmission at an operating wavelength;
  - an optical interface including at least one ferrule;
  - at least one single-mode fiber stub terminated by the at least one ferrule, wherein each single-mode fiber stub of the at least one single-mode fiber stub forms an optical connection with a respective multimode optical fiber of the at least one multimode optical fiber, and wherein each single-mode fiber stub of the at least one single-mode fiber stub:
    - is optically coupled to an optical-electronic sub-assembly of the at least one optical-electronic assembly,
    - has a mode field diameter within 20% of a mode field diameter of the at least on respective multimode optical fiber at the operating wavelength, and
    - has a fiber cutoff wavelength below the operating wavelength.

13. The fiber optic system of claim 12, wherein for each single-mode fiber stub of the at least one single-mode fiber stub the center of the core of the single-mode fiber stub is within 2 μm of a center of a core of the respective multimode optical fiber at the optical connection.

14. The fiber optic system of claim 12, wherein each multimode optical fiber of the at least one multimode optical fiber comprises OM5 multimode optical fiber.

15. The fiber optic system of claim 12, wherein each multimode optical fiber of the at least one multimode optical fiber comprises OM1, OM2, OM3, or OM4 multimode optical fiber.

16. The fiber optic system of claim 12, wherein the operating wavelength is in a range from 1260-1360 nm or in a range from 1530-1565 nm.

17. The fiber optic system of claim 12, wherein the optical transceiver further comprises:
- a female connection interface that includes a front end of the at least one ferrule, wherein each single-mode fiber stub of the at least one single-mode fiber stub extends from a back end of the ferrule that terminates the single-mode fiber stub.

18. The fiber optic system of claim 17, wherein the female connection interface of the optical transceiver is configured to accept a duplex connector.

19. The fiber optic system according of claim 17, wherein the female connection interface of the optical transceiver is configured to accept a multi-fiber connector.

20. A method of upgrading a system having multimode optical transceivers connected by multimode optical fiber, the method comprising:
- replacing the multimode optical transceivers with single-mode optical transceivers, wherein each single-mode optical transceiver comprises:
  - a housing;
  - at least one optical-electronic sub-assembly within the housing configured for single-mode transmission at an operating wavelength;
  - an optical interface including at least one ferrule; and
  - at least one single-mode fiber stub terminated by the at least one ferrule, wherein each single-mode fiber stub of the at least one single-mode fiber stub:
    - is optically coupled to an optical-electronic sub-assembly of the at least one optical-electronic assembly,
    - has a mode field diameter within 20% of a mode field diameter of the fundamental mode of the multimode optical fiber at the operating wavelength, and
    - has a fiber cutoff wavelength below the operating wavelength.

* * * * *